*INVENTORS*
LOUIS D. WILSON
HERBERT F. WELSH
JOHN P. ECKERT, JR.
*BY* [signature]
ATTORNEY

INFORMATION TRANSLATING APPARATUS

INVENTORS
LOUIS D. WILSON
HERBERT F. WELSH
JOHN P. ECKERT, JR.
BY George Beltzroth
ATTORNEY INVENTORS
LOUIS D. WILSON
HERBERT F. WELSH
JOHN P. ECKERT, JR.
BY George V. Eltgroth
ATTORNEY

INFORMATION TRANSLATING APPARATUS

Filed March 31, 1952 17 Sheets-Sheet 4

INVENTORS
LOUIS D. WILSON
HERBERT F. WELSH
JOHN P. ECKERT, JR.
BY
George Beltzwith
ATTORNEY Nov. 18, 1958 L. D. WILSON ET AL 2,860,756

INFORMATION TRANSLATING APPARATUS

Filed March 31, 1952 17 Sheets-Sheet 5

INVENTORS
LOUIS D. WILSON
HERBERT F. WELSH
JOHN P. ECKERT, JR.
BY
ATTORNEY

INVENTORS
LOUIS D. WILSON
HERBERT F. WELSH
JOHN P. ECKERT, JR.
BY
ATTORNEY

INVENTORS
LOUIS D. WILSON
HERBERT F. WELSH
JOHN P. ECKERT, JR.
BY George V. Eltgroth
ATTORNEY Nov. 18, 1958 L. D. WILSON ET AL 2,860,756

INFORMATION TRANSLATING APPARATUS

Filed March 31, 1952 17 Sheets-Sheet 8

INVENTORS
LOUIS D. WILSON
HERBERT F. WELSH
JOHN P. ECKERT, JR.

BY

George [signature]
ATTORNEY

INFORMATION TRANSLATING APPARATUS

Filed March 31, 1952 17 Sheets-Sheet 9

*INVENTORS*
LOUIS D. WILSON
HERBERT F. WELSH
JOHN P. ECKERT, JR.

BY George V. Eltgroth
ATTORNEY

INFORMATION TRANSLATING APPARATUS

Filed March 31, 1952 17 Sheets-Sheet 10

INVENTORS
LOUIS D. WILSON
HERBERT F. WELSH
JOHN P. ECKERT, JR.
BY George V. Eltgroth
ATTORNEY INVENTORS
LOUIS D. WILSON
HERBERT F. WELSH
JOHN P. ECKERT, JR.
BY George [signature]
ATTORNEY

INFORMATION TRANSLATING APPARATUS

Filed March 31, 1952 17 Sheets-Sheet 12

INVENTORS
LOUIS D. WILSON
HERBERT F. WELSH
JOHN P. ECKERT, JR.
BY
George V. Eltgroth
ATTORNEY INVENTORS
LOUIS D. WILSON
HERBERT F. WELSH
JOHN P. ECKERT, JR.
BY George [signature]
ATTORNEY Nov. 18, 1958 L. D. WILSON ET AL 2,860,756

INFORMATION TRANSLATING APPARATUS

Filed March 31, 1952 17 Sheets-Sheet 14

INVENTORS
LOUIS D. WILSON
HERBERT F. WELSH
JOHN P. ECKERT, JR.

BY George Reltgroth
ATTORNEY

*INVENTORS*
LOUIS D. WILSON
HERBERT F. WELSH
JOHN P. ECKERT, JR.
BY
ATTORNEY

*INVENTORS*
LOUIS D. WILSON
HERBERT F. WELSH
JOHN P. ECKERT, JR.
*BY* George [signature]
ATTORNEY Nov. 18, 1958 L. D. WILSON ET AL 2,860,756

INFORMATION TRANSLATING APPARATUS

Filed March 31, 1952 17 Sheets-Sheet 17

INVENTORS
LOUIS D. WILSON
HERBERT F. WELSH
JOHN P. ECKERT, JR.

BY George V. Eltgroth
ATTORNEY

United States Patent Office 2,860,756

Patented Nov. 18, 1958

2,860,756

INFORMATION TRANSLATING APPARATUS

Louis D. Wilson and Herbert F. Welsh, Philadelphia, and John Presper Eckert, Jr., Gladwyne, Pa., assignors, by mesne assignments, to Sperry Rand Corporation, New York, N. Y., a corporation of Delaware Application March 31, 1952, Serial No. 279,711

25 Claims. (Cl. 197—19)

This invention relates to an electrical system uniquely responding to coded combinations and more particularly to such an electrical system having the property of decoding coded combinations and producing a copy thereof.

The invention is of general utility in a computing system wherein information is received, recorded and issued at speeds capable only by electronically-operated apparatus. Such a system conveniently employs coded combinations representing the information, and the resulting coded combinations are decoded and a record thereof produced.

Accordingly, one of the principal objects of the invention is to provide new and novel apparatus to convert coded combinations into decoded copy.

Another object of the invention is to provide a new and novel electrical apparatus to convert coded combinations into a typewritten copy.

Another object of the invention is to provide new and novel electrical apparatus to convert coded combinations representing characters and typewriter operations into a normal copy.

Another object of the invention is to provide a new and novel electrical apparatus to convert coded combinations representing characters and typewriter operations into a decoded copy in which a character is obtained for substantially every code combination.

Another object of the invention is to provide a new and novel electrical apparatus to convert coded combinations into a decoded record and to reject improper code combinations.

Another object of this invention is to provide new apparatus for automatically translating information from one language or code medium into another language or code medium.

Figure 2:
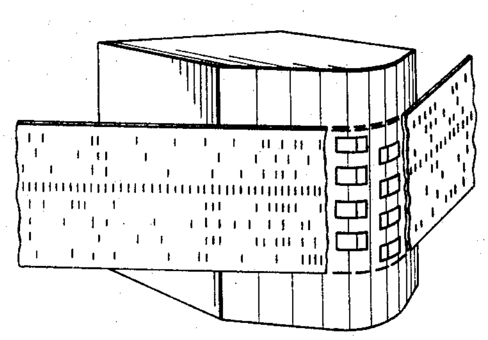
Figure 1:
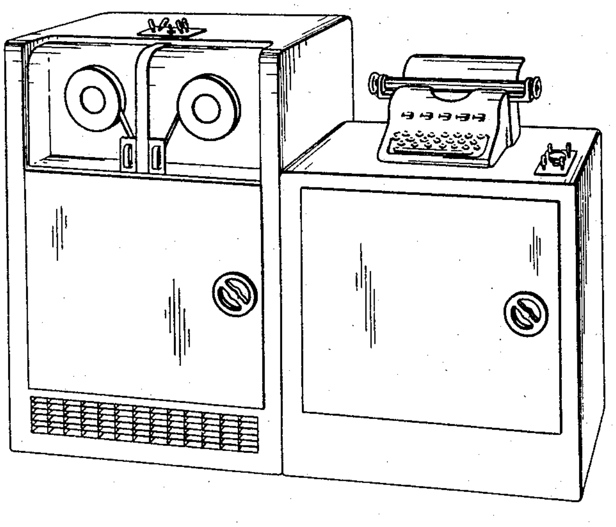
Figure 3:
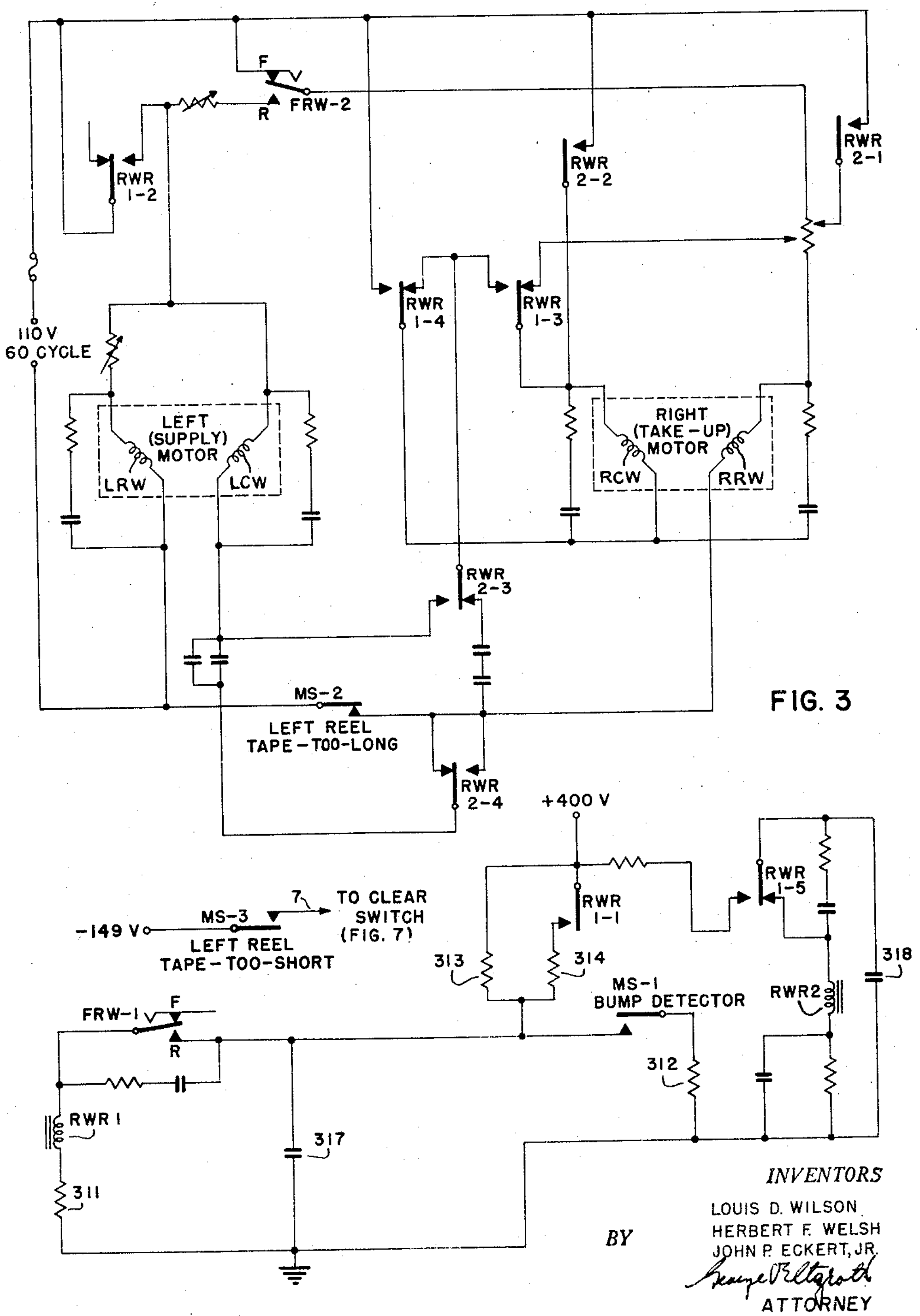
Figure 4:
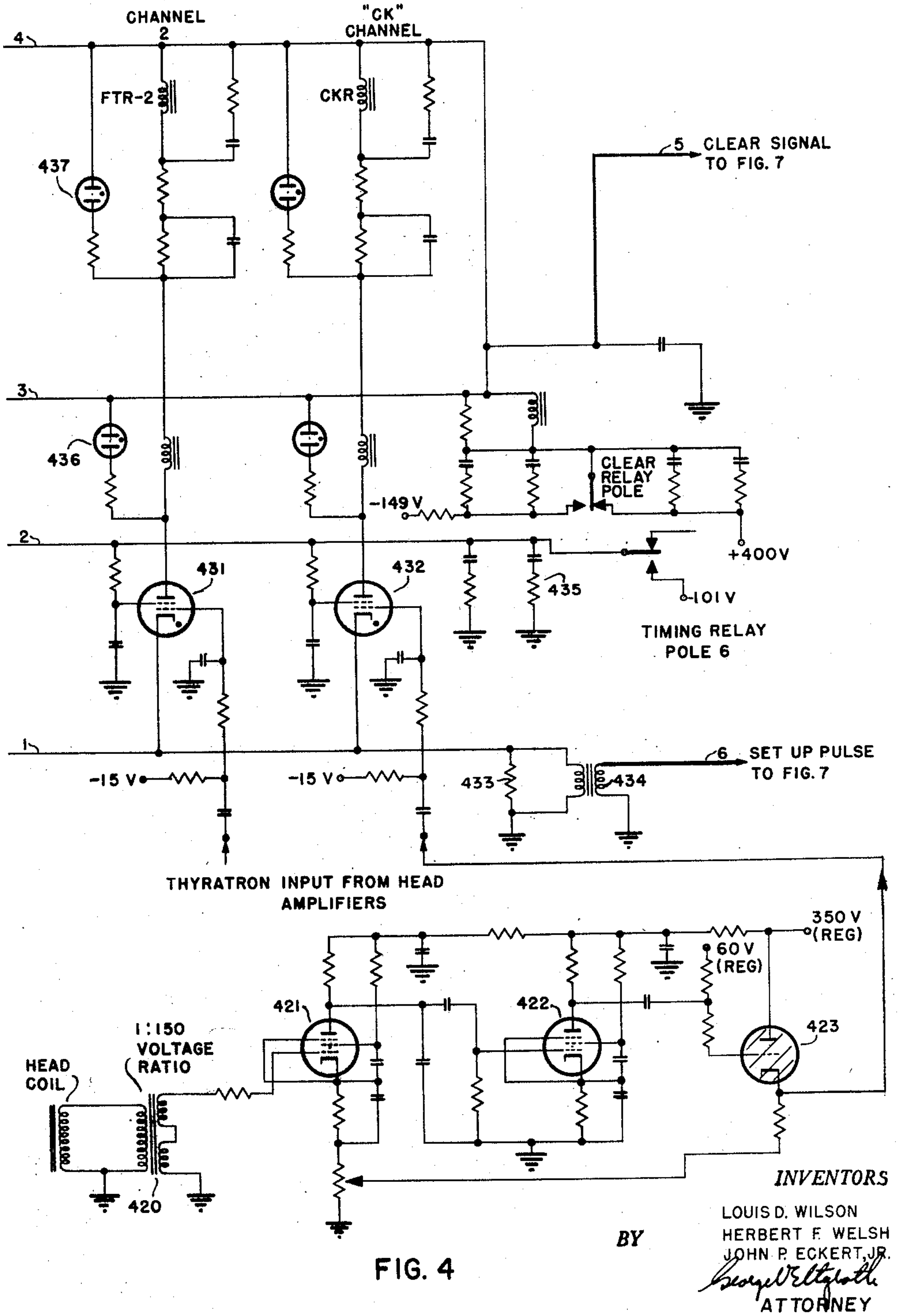
Figure 5:
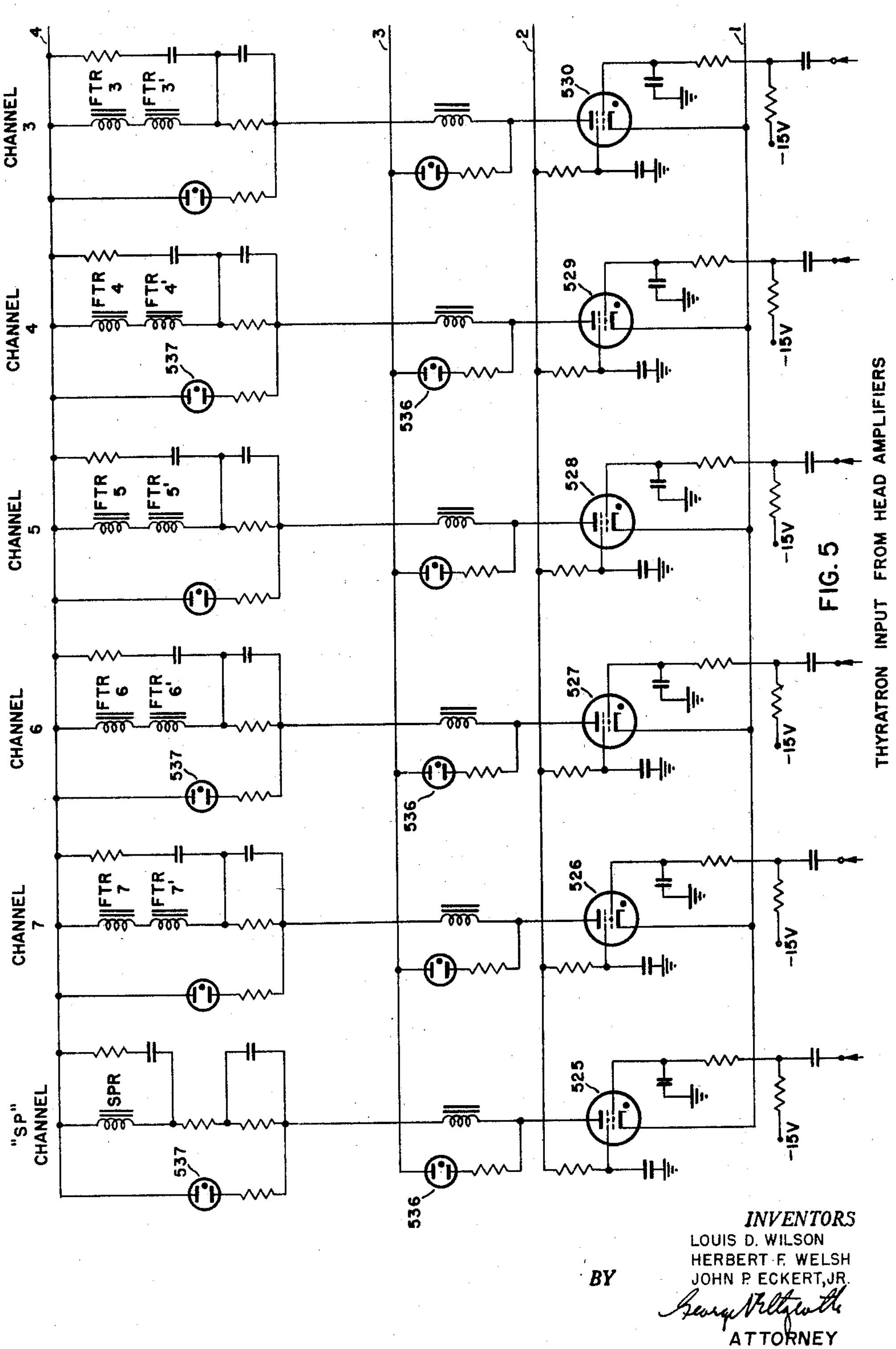
Figure 6:
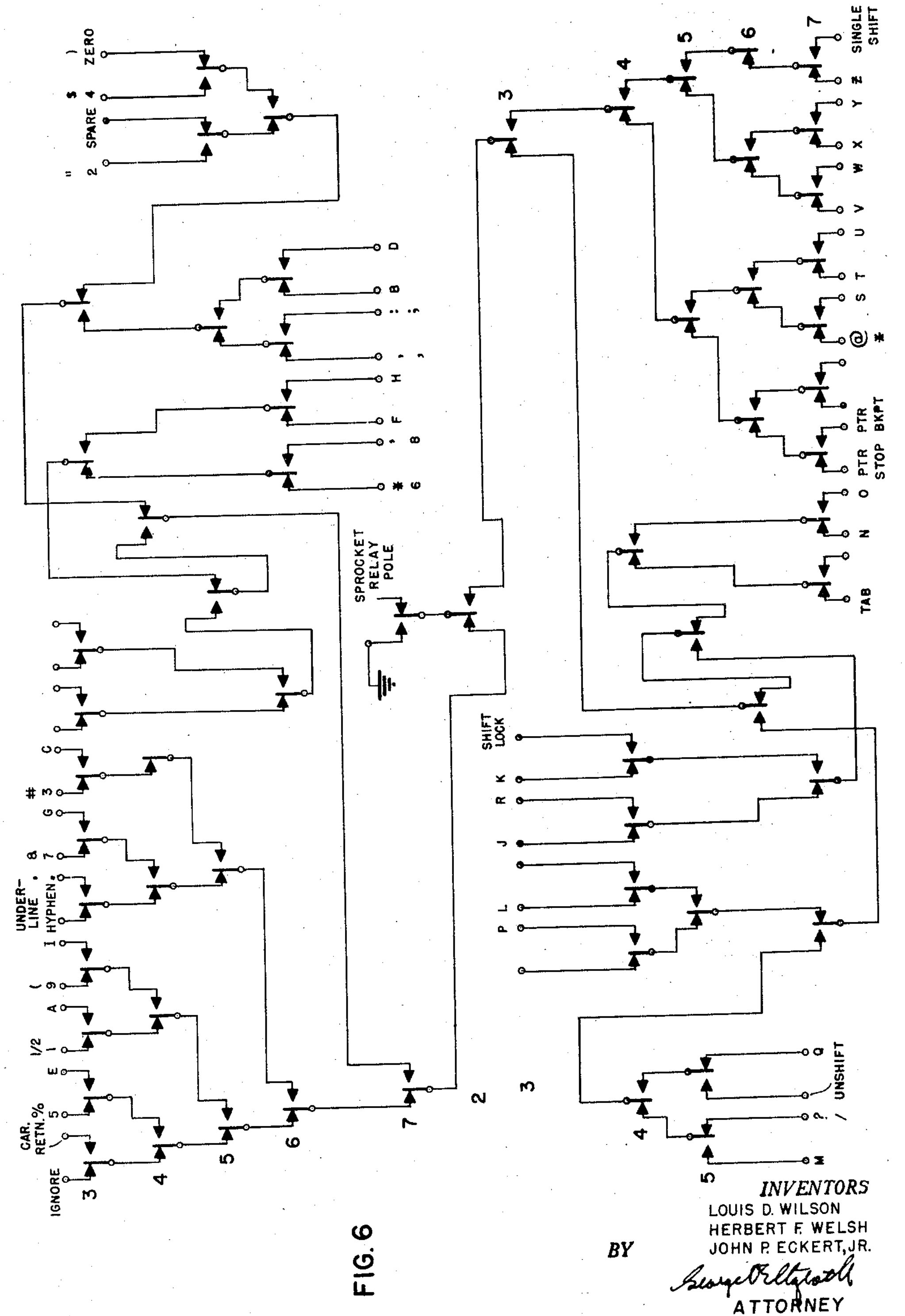
Figure 7:
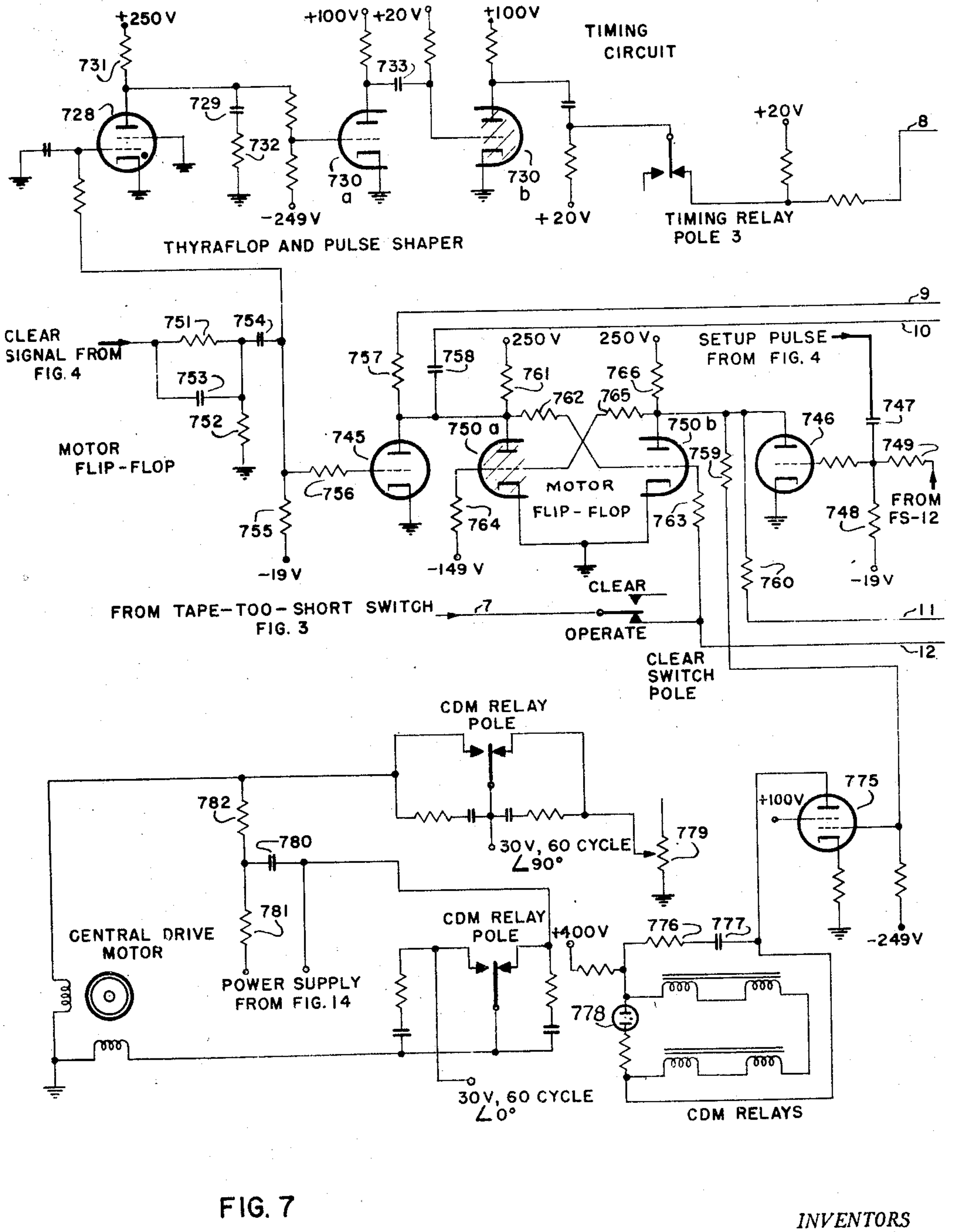
Figure 8:
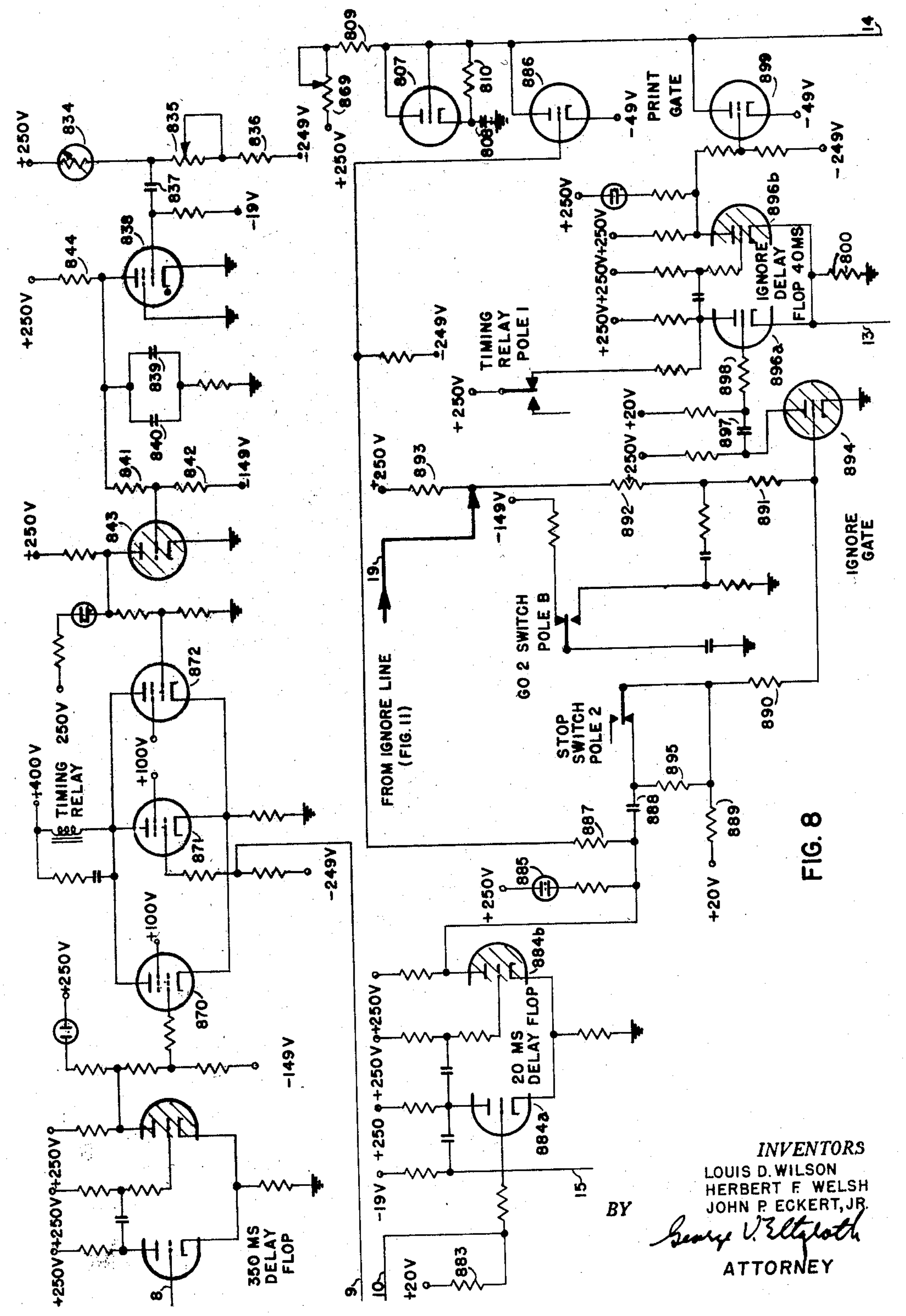
Figure 9:
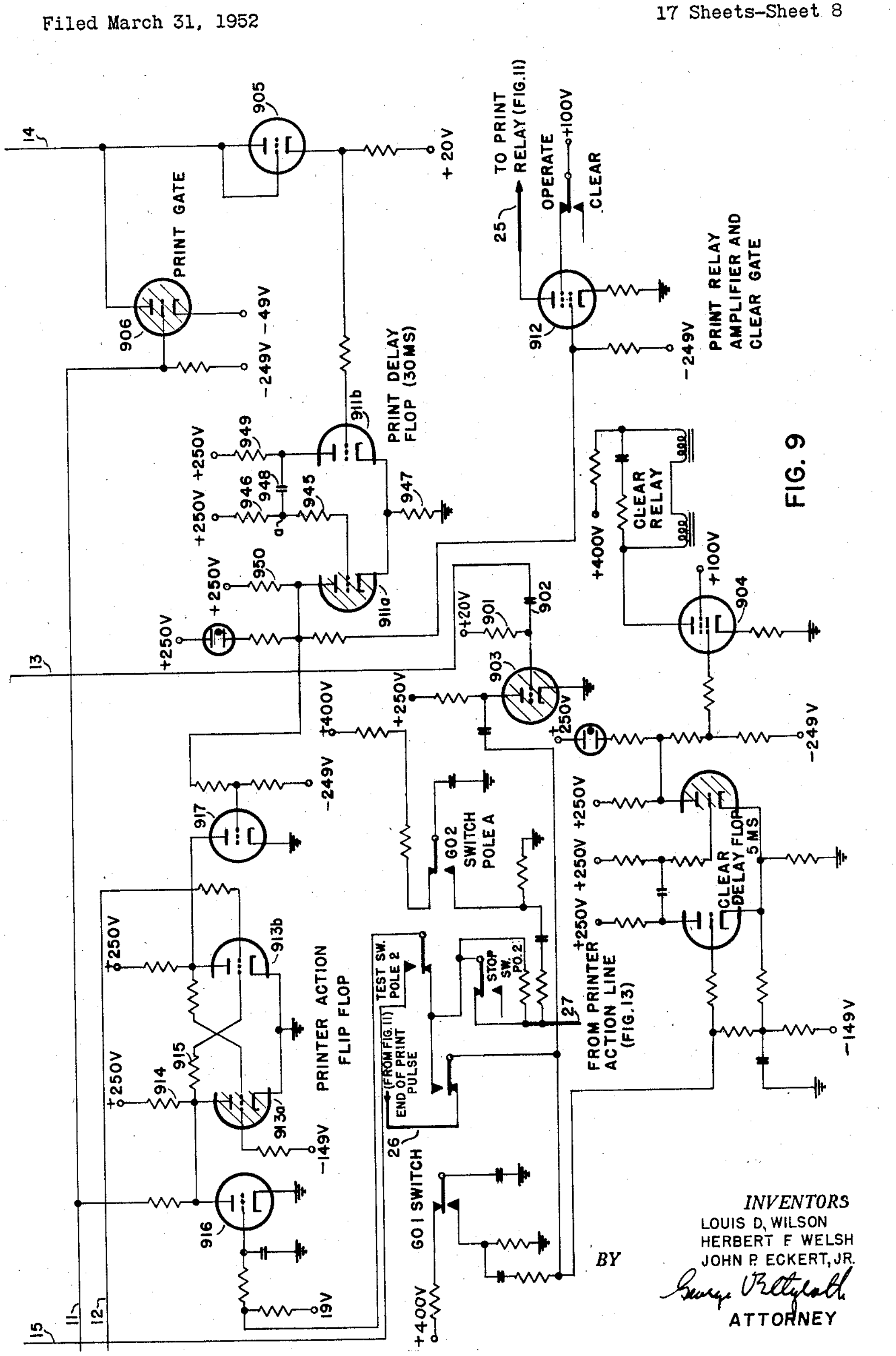
Figure 12:
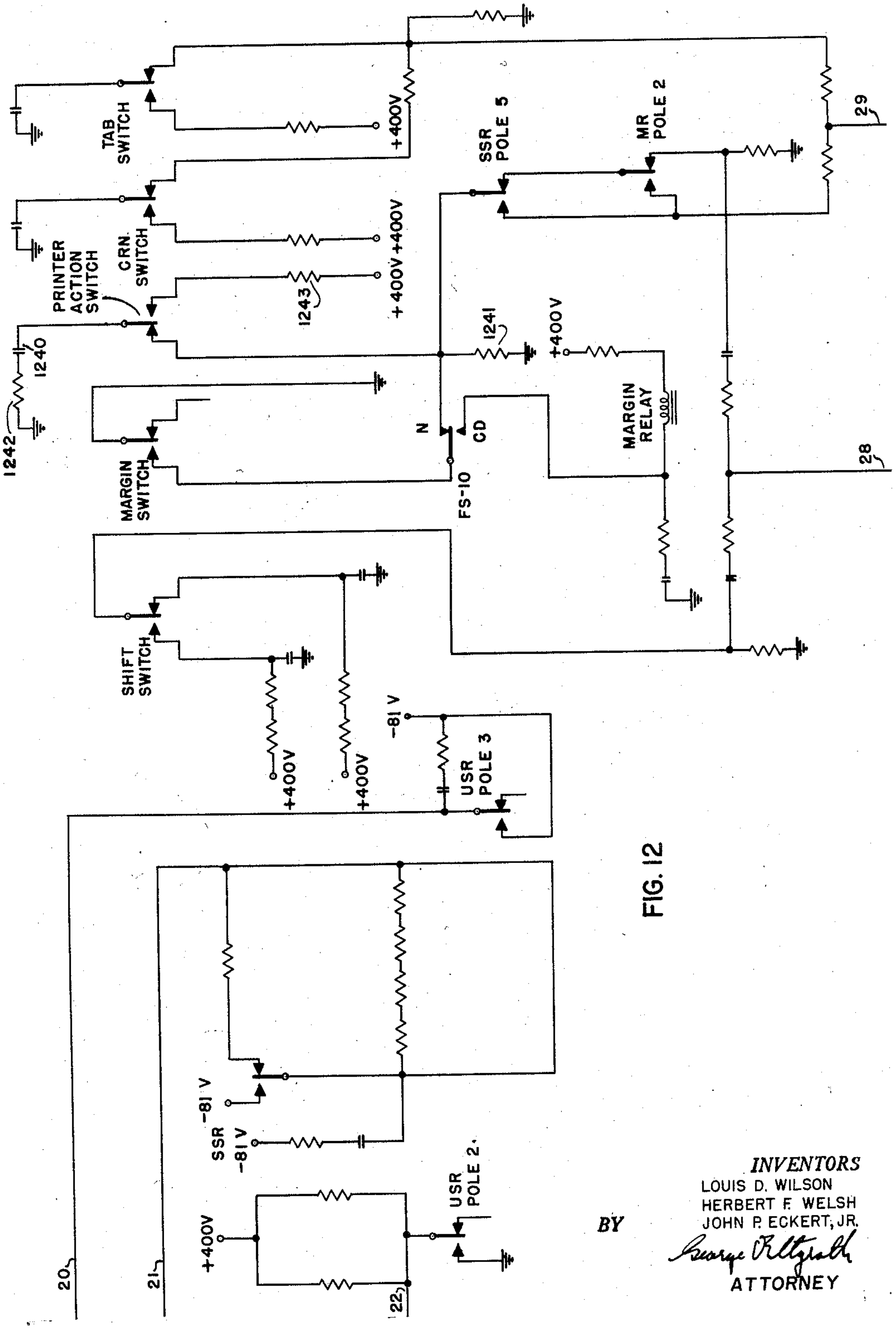
Figure 13:
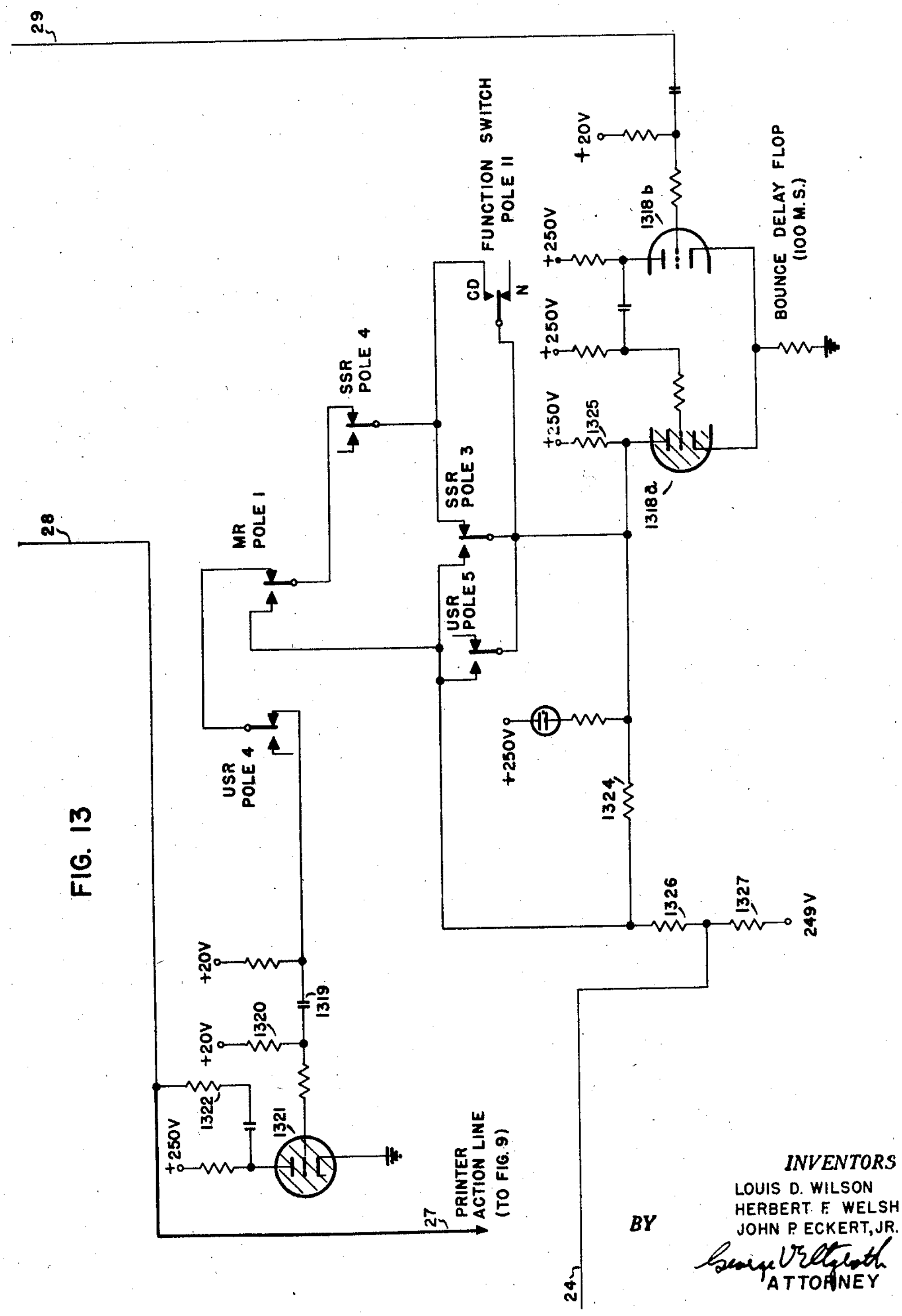
Figure 14:
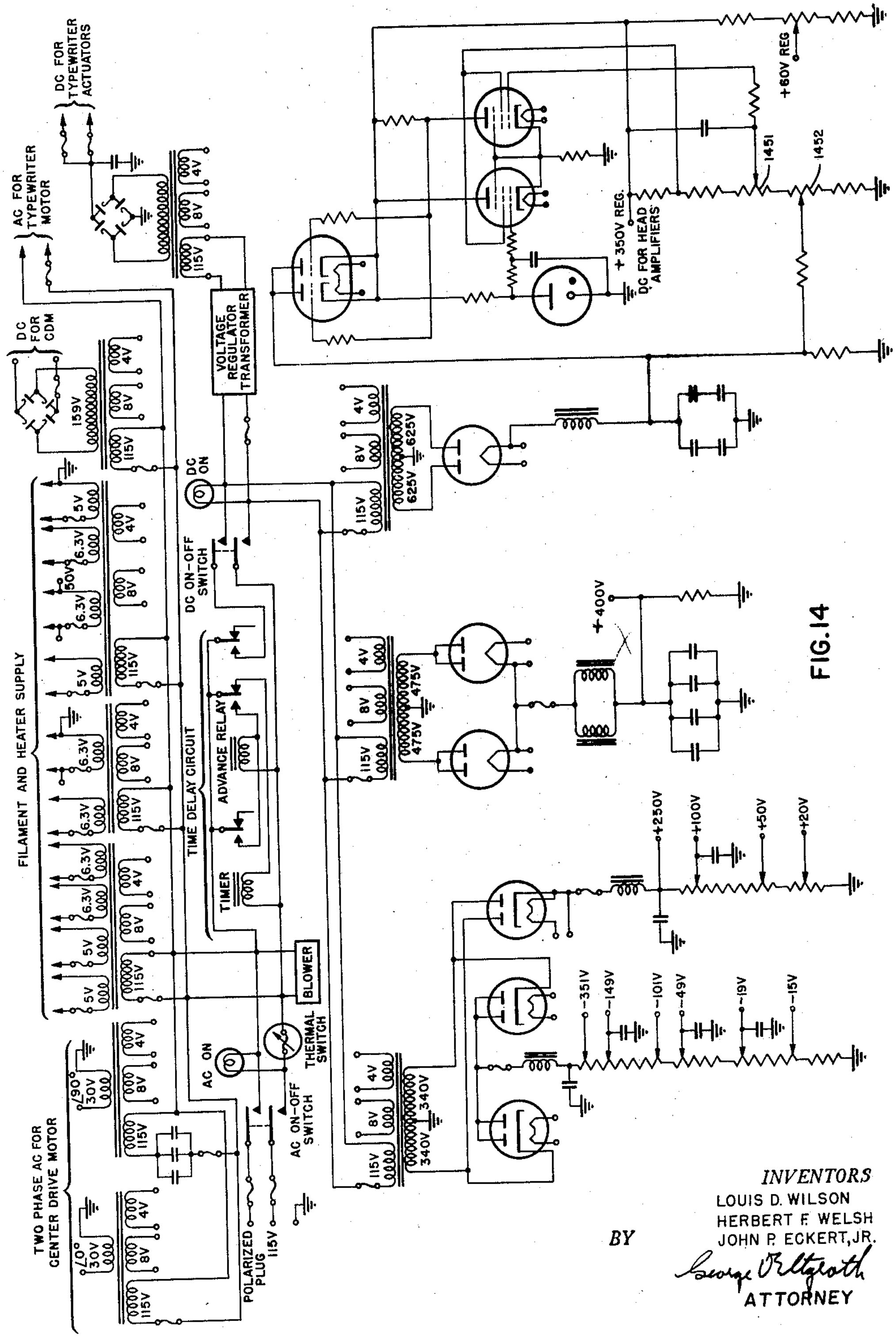
Figure 15:
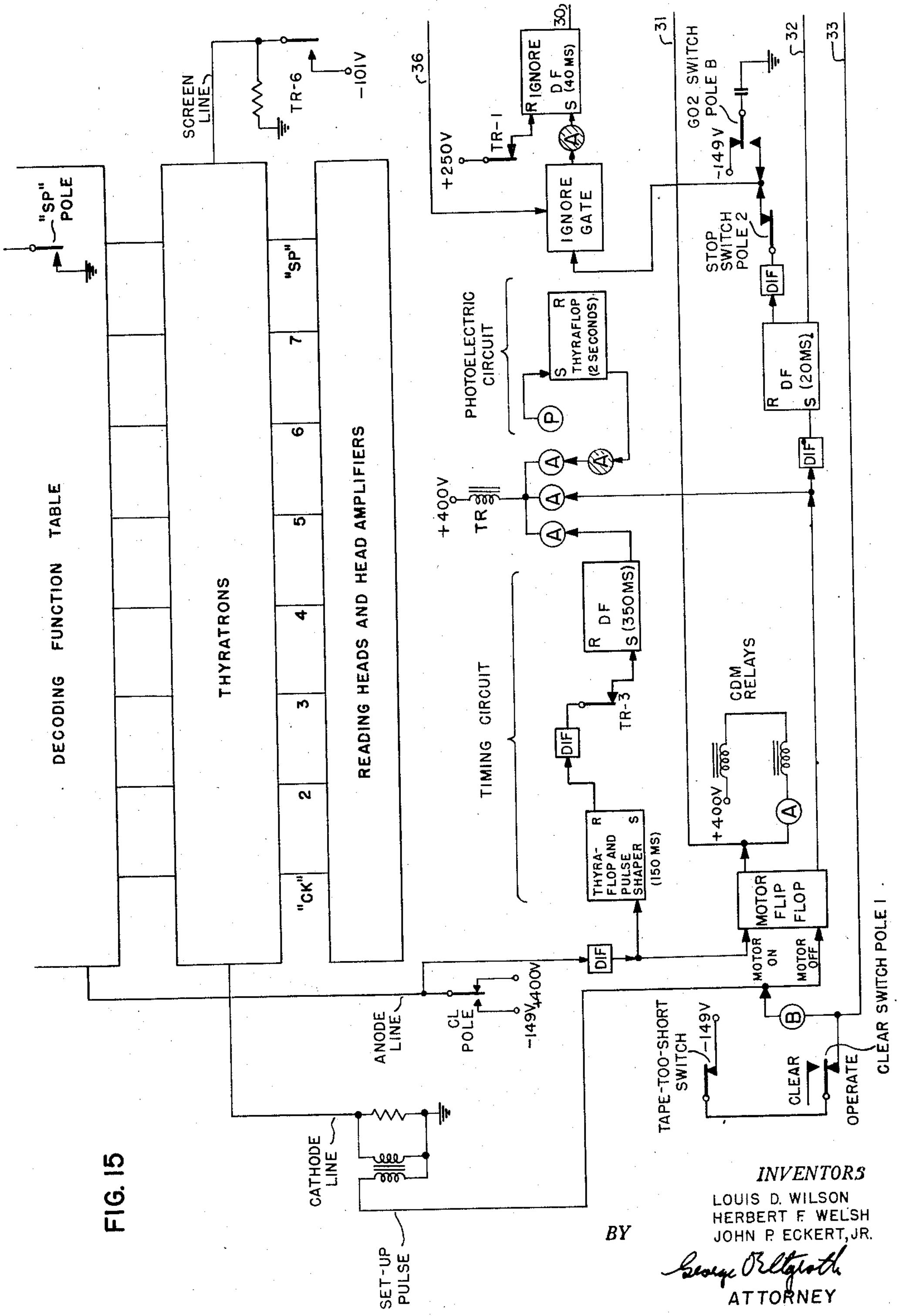
Figure 16:
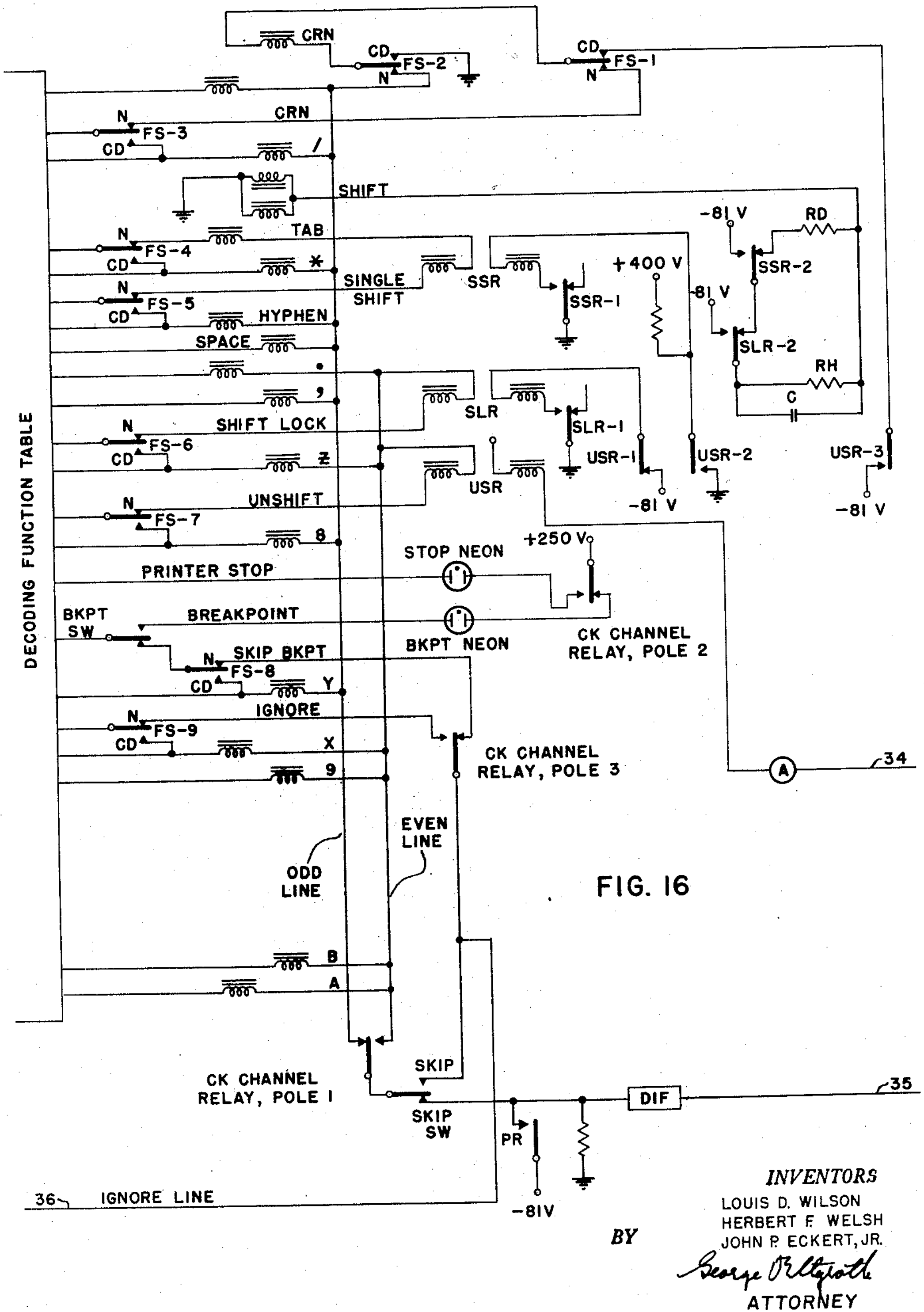
Figure 17:
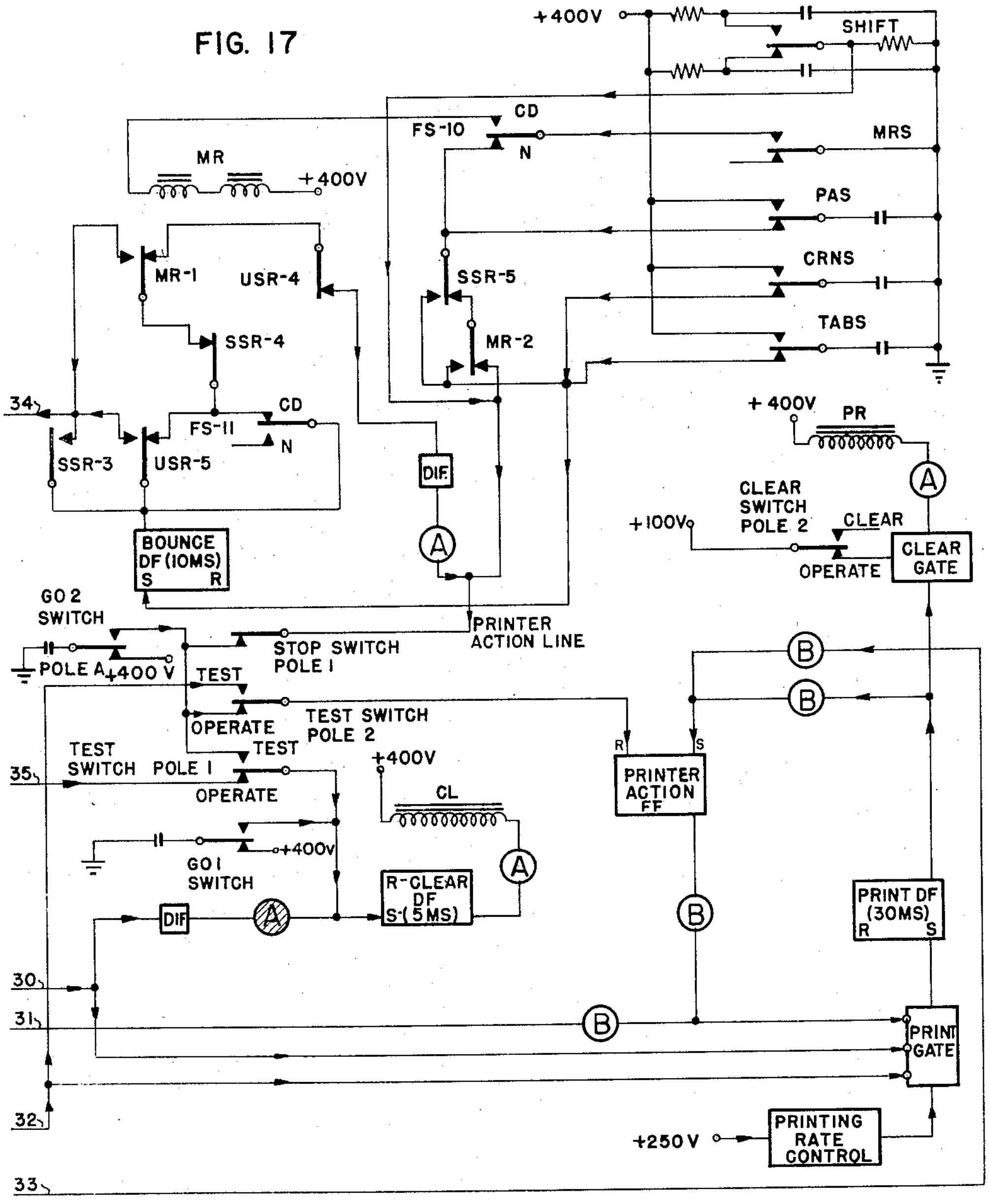
Figure 18:
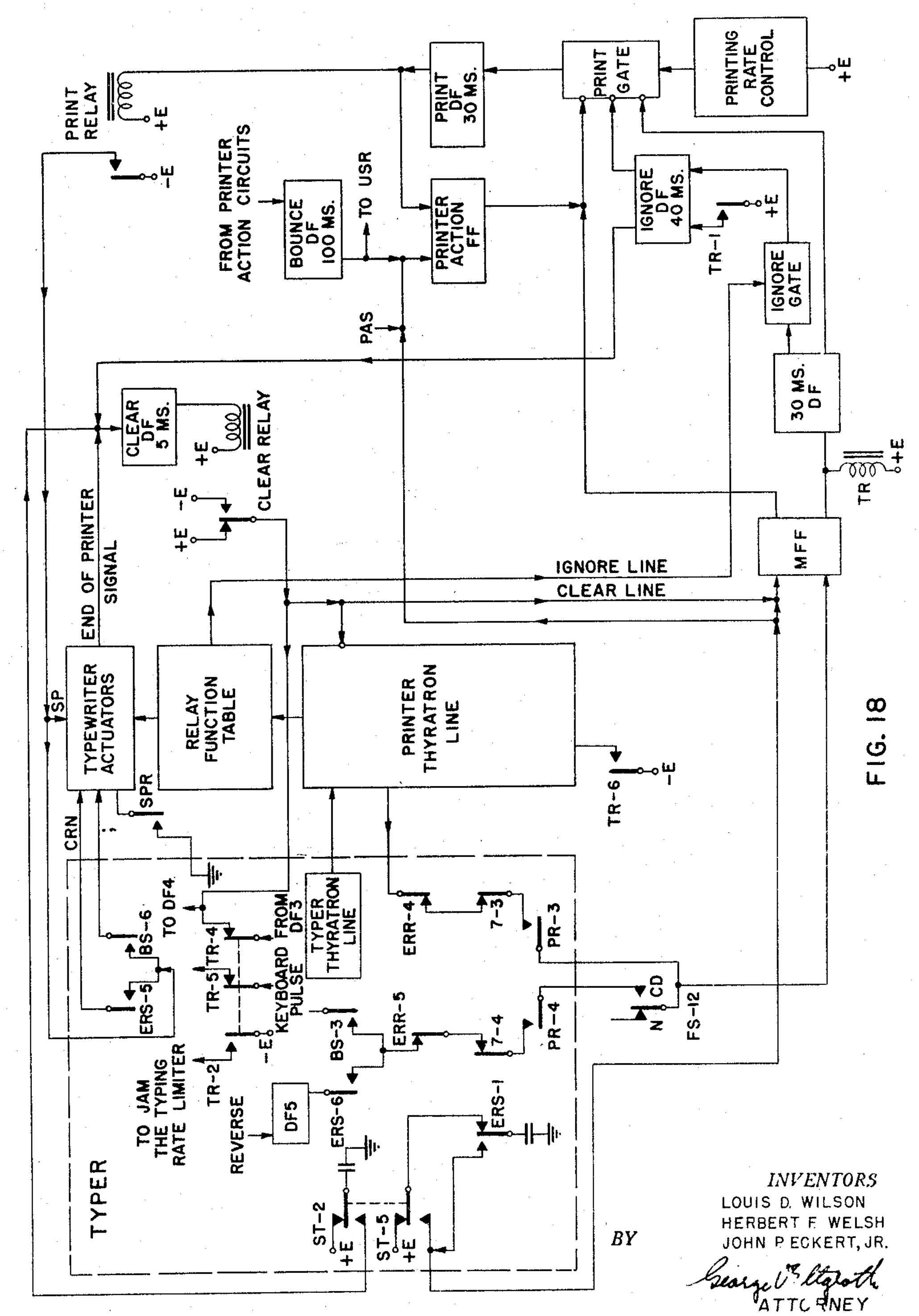

Other objects of the invention will in part be described and in part be obvious as the following specification is read in conjunction with the drawings in which:

Figure 1 is a perspective view showing a physical embodiment of the invention,

Figure 2 is a perspective view of a coded tape and magnetic reading head in relative alignment, Figure 3 is a schematic diagram of the reel motor circuits, Figures 4 and 5, together, constitute a schematic diagram of the input circuits, Figure 6 is a schematic diagram of the function table, Figures 7, 8 and 9, together, constitute a schematic diagram of some of the control circuits, Figures 10, 11, 12 and 13, together, constitute a schematic diagram of further control circuits, Figure 14 is a schematic diagram of the power supply, Figures 15, 16 and 17, together, constitute a block diagram illustrating the apparatus incorporating this invention, and Figure 18 is a block diagram illustrating a modification of the apparatus incorporating this invention.

I. GENERAL INFORMATION

The particular embodiment described herein of the invention comprises apparatus to accept information represented by coded combinations and prepare a decoded, typewritten copy of the information. The binary scale of notation is utilized in the recording of data and its transcription therefrom. Information is stored by the way of minute magnetized spots which will be referred to as pulses; for example, as indicated in more detail hereafter, a magnetic tape may be provided with multiple lengthwise channels carrying the pulses selectively arranged so that a particular combination of pulses existing in corresponding positions in the various channels may represent numbers, letters, punctuation, typewriter instructions or other information. The recording process is such that the entire area of each channel on the tape has been magnetically saturated by flux in a first direction. Wherever a pulse or "one" occurs, the saturating current is reversed in direction. Therefore, ones are represented by a reversal in the direction of magnetization from that which normally exists. Any channel not having such a change in polarity of magnetization at the location being considered represents a "zero."

The pulses are recorded in eight parallel channels on the tape at a density of twenty pulses per inch in each channel. Of the eight channels, six channels carry the coded information, the seventh channel carries a check pulse, and the eighth channel carries a sprocket pulse. The check pulse channel contains a pulse whenever the number of binary ones in the first six channels is even. Thus the sum of binary ones in the first seven channels is always an odd number. The presence of a pulse in the sprocket channel indicates that the pulse combination in the seven other channels should constitute a character of the pulse combination code. This binary pulse combination code has $2^6$ or sixty-four possible code combinations, of which only fifty-one are actually effective in the particular embodiment of the invention described herein. The binary pulse combination code employed and the equivalent characters and various typewriter operations are given in the table. This table does not include the sprocket pulse which must accompany each pulse combination.

The apparatus which incorporates the present invention, referred to in its entirety as the "printer" hereinafter, consists of two assemblies: the tape reader and the printer dolly, and is a unit complete within itself. The tape reader assembly includes two reel motors, a center drive motor, a reading head, and a photocell. This equipment, as well as most of the associated electronic circuits, is mounted within the frame of the tape reader. The printer dolly assembly, which is cabled to the tape reader, contains an electric typewriter, a decoding function table and control relays.

For a clearer understanding of the particular circuit arrangements shown in the accompanying drawings, and for convenience in describing the circuits in detail, typical values for the potentials of the various power sources have been shown in the drawings. Reference to these potentials is, therefore, intended to indicate appropriate power sources. It will be understood, of course, that the potential values are given by way of illustration only, and that they may be varied depending upon the specific circuit conditions. Positive voltage sources are identified by even numbers of like voltage; negative voltage sources by odd numbers of like voltage. All relay poles are shown in the drawings in a de-energized position while all switch poles are presented in a non-operated position.

*Pulse combination code*

| Character | | Pulse Code Channel | | |
|---|---|---|---|---|
| Lower Case | Upper Case | ck | 23 | 4567 |
| a | A | 1 | 01 | 0100 |
| b | B | 0 | 01 | 0101 |
| c | C | 0 | 01 | 0110 |
| d | D | 1 | 01 | 0111 |
| e | E | 1 | 01 | 1000 |
| f | F | 0 | 01 | 1001 |
| g | G | 0 | 01 | 1010 |
| h | H | 1 | 01 | 1011 |
| i | I | 0 | 01 | 1100 |
| j | J | 1 | 10 | 0100 |
| k | K | 0 | 10 | 0101 |
| l | L | 0 | 10 | 0110 |
| m | M | 1 | 10 | 0111 |
| n | N | 1 | 10 | 1000 |
| o | O | 0 | 10 | 1001 |
| p | P | 0 | 10 | 1010 |
| q | Q | 1 | 10 | 1011 |
| r | R | 0 | 10 | 1100 |
| s | S | 1 | 11 | 0101 |
| t | T | 1 | 11 | 0110 |
| u | U | 0 | 11 | 0111 |
| v | V | 0 | 11 | 1000 |
| w | W | 1 | 11 | 1001 |
| x | X | 1 | 11 | 1010 |
| y | Y | 0 | 11 | 1011 |
| z | Z | 1 | 11 | 1100 |
| 1 | ½ | 0 | 00 | 0100 |
| 2 | " (quote) | 1 | 00 | 0101 |
| 3 | # | 1 | 00 | 0110 |
| 4 | $ | 0 | 00 | 0111 |
| 5 | % | 0 | 00 | 1000 |
| 6 | * | 1 | 00 | 1001 |
| 7 | & | 1 | 00 | 1010 |
| 8 | ' (apostrophe) | 0 | 00 | 1011 |
| 9 | ( | 1 | 00 | 1100 |
| 0 | ) | 1 | 00 | 0011 |
| . (period) | . (period) | 1 | 01 | 0010 |
| , (comma) | , (comma) | 1 | 01 | 0001 |
| ; (semicolon) | : (colon) | 0 | 01 | 0011 |
| - (hyphen) | _ (underline) | 0 | 00 | 0010 |
| * | @ | 0 | 11 | 0100 |
| / (virgule) | ? | 0 | 10 | 0011 |
| Ignore | --------------- | 1 | 00 | 0000 |
| Space | --------------- | 0 | 00 | 0001 |
| Tabulation | --------------- | 0 | 10 | 0000 |
| Carriage Return | --------------- | 0 | 01 | 0000 |
| Single Character Shift | --------------- | 0 | 11 | 1101 |
| Shift Lock | --------------- | 1 | 10 | 1101 |
| Unshift | --------------- | 0 | 10 | 1111 |
| Printer Breakpoint | --------------- | 0 | 11 | 0001 |
| Printer Stop | --------------- | 1 | 11 | 0000 |

The printer is ready for operation after a tape has been placed on the reel hubs and properly threaded over the magnetic reading head. Pushing a "go" switch momentarily to the GO1 position causes the center drive motor to pull the tape over the head. As soon as a pulse combination is detected, the center drive motor stops. The pulse combination is set up in a line of thyratron tubes and in a set of neon indicator lights. The anode circuits of the thyratrons include the actuating coils of the decoding relays.

Pushing the "go" switch momentarily to the GO2 position starts the main sequence of operations. A relay pole connects a decoding function table to a power source energizing the proper magnetic actuator under an electric typewriter. The selected actuator pulls the corresponding typewriter key and types the character on paper.

As the type bar returns to rest position, a printer action signal is generated and indicates to the printer circuits that the character has been typed. Meanwhile, the printer brings in the next code combination from the tape and readies itself for the next cycle of operation. Typing continues until a special code combination, a switch setting, or an error halts the printer. If any combination sets up which does not contain an odd number of binary ones, the chain of cyclic operation is broken.

There are special circuits to accommodate the operations of shift, tabulation, and carriage return. Each of these operations is represented by a coded combination which follows the rules of the odd-even check system.

A special mode of printer operation can be switched in by a function switch. When the function switch is set to Normal, all operations occur normally. However, when the function switch is set to Computer Digit a typed character is obtained for every code combination on the tape. In the Computer Digit mode of operation the carriage return function is initiated by the margin stop on the typewriter rather than by the carriage return code combination from the tape. All the typed lines are of equal length in Computer Digit copy.

In addition to the function switch there are "skip" and "breakpoint" switches on the printer dolly. When the breakpoint switch rests at Normal, the printer does not stop at printer breakpoint code combinations on the tape: if the function switch is also in Normal, the printer will disregard the breakpoint; but if the function switch is in Computer Digit, the printer will type a "y" at the breakpoint. With the breakpoint switch set to BKPT, the printer will stop at the printer breakpoint combination, regardless of the setting of the function switch. The code combination for "printer stop" will halt the printer, regardless of the setting of any switches.

Operation of the skip switch has the same effect for either setting of the function switch. When the skip switch is set to Skip, the printer advances the tape over all of the recorded characters at an increased rate without typing the characters. Even in Skip, the printer will stop at a printer stop combination, or, if the switches are properly set, at a printer breakpoint combination. The skip switch may be used in hunting through a tape for specific information.

The typing rate of the printer is about eleven characters per second. Regularity of recording on the tape is not essential to the printer since it searches the tape until a character appears. Thus, spaces are passed over by the printer without effect on the typed copy.

In order to produce a fully "edited" copy, the various typewriter operations must be prearranged or programmed on the tape as part of the original recording. Tab stops must be set manually.

A detailed description of apparatus embodying the invention will now be given in connection with the drawings of a particular embodiment thereof. Throughout the description and in the various figures of the drawing the following legend is used:

A—amplifier
B—buffer
BKPT—breakpoint
CD—computer digit
CDM—center drive motor
CK—check
CL—clear
CRN—carriage return
CRNS—carriage return switch
DF—delay flop
DIF—differentiator
FF—flip-flop
FC—function switch
FTR—function table relay
MFF—motor flip-flop
MR—margin relay
MRS—margin switch
MS—milliseconds
N—normal
P—photoelectric cell
PAS—printer action switch
PR—print relay
RWR—rewind relay
SLR—shift lock relay
SP—sprocket
SSR—single shift relay
TAB—tabulation
TF—thyraflop
TR—timing relay
USR—carriage return and unshift relay The tape panel on the tape reader holds the reel motors, the tape tension system, the center drive motor, the reading head, and all of the switches directly involved in controlling the motion of the magnetic tape.

The center drive motor is a two-phase synchronous motor and controls the tape movement during the tape "reading" operation. The center drive motor is under the direct control of the motor flip-flop, as will be described. The center drive motor is geared to a capstan shaft with a fifty-to-one ratio right-angle drive. A nut on the shaft can tighten a cork-wrapped capstan to the shaft. This capstan pulls the magnetic tape over the reading head. The tightening or slackening of the tape loops affects the tape tension system and controls the reel motors. If the capstan nut is loosened, the tape is controlled by the reel motors and the tape tension system only.

II. REEL MOTORS CONTROL CIRCUITS, FIG. 3

The reel motors on the tape panel are controlled by the reel motor circuits and by the tape tension system as shown in Figure 3. The reel motor circuits include a forward-rewind switch, FRW; three miniature switches, MS1–3; and two rewind relays, RWR1 and RWR2 which are shown in the deenergized or Forward position in Fig. 3. The miniature switches in the reel motor circuits are controlled by the tape tension system. The tape tension system involves two movable pulleys, connecting cords, a tension spring, and brakes on the reel motors.

The reeling system uses a mechanical servo. Each reel mount has a band type brake system which releases whenever the associated loop of tape grows or shrinks to certain preassigned limits. The reel motors move the tape forward or backward. During reading operations of the printer, the right motor reels tape when its brake is released by the left tape tension system; and the left motor brake is released when the left loop of tape becomes too short.

The printer can reel tape either forward or backward at high speed. High speed forward reeling is intended for skipping tape sections rapidly. When the forward-rewind switch is in Forward position, which position is denoted by "F" in Fig. 3, the take-up reel motor is energized. The high speed forward lever releases the brakes on the take-up reel, permitting this reel to pull the tape forward as fast as the friction in the tape system will allow.

In high speed rewind both reel motors are energized, with more power supplied to the left motor. The reel motor brakes act as drags, but they are not as effective as in forward operation, because of the directional properties of the brake system. High speed rewind operation is set up by moving the forward-rewind switch lever to Rewind (R). The rewind operation comes to an automatic stop when rubber bumps on the tape leader pass under a specially adjusted arm on the bump detector switch MS–1.

The reel motor circuits are the same, whether the printer is in high speed forward operation, or in normal speed forward operation governed by the center drive motor. With the FRW switch in the Forward position, FRW pole 2 applies power to the capacitor winding RCW of the take-up motor through relay poles RWR1–3, RWR1–4 and RWR2–3. Also, power from FRW–2 is applied to the resistor winding of this motor through MS–2.

If the entire tape is used, the left loop shortens and the loop pulley operates the "tape-too-short" switch MS–3. This switch locks the motor flip-flop in "motor-off" and prevents typing by locking the printer action FF so that it inhibits the print gate, as will be described hereinafter.

If the FRW switch has been in Rewind position since before the power was turned on, the rewind relays RWR1 and RWR2 will not pick up, because capacitors 317 and 318 will not charge to a sufficient value to pick up these relays. The relays RWR1 and RWR2 are energized from a 400 volt, direct-current source.

When the FRW switch is changed to the Forward position, FRW–1 disconnects RWR1 from across capacitor 317, and capacitor 317 charges to approximately 350 volts. When the FRW switch is returned to the Rewind position, capacitor 317 discharges through FRW–1, relay coil RWR1, and resistor 311 to ground. Relay RWR1 pulls in. RWR1–1 shunts the charging resistor 313 with resistor 314, reducing the series resistance to supply sufficient holding current for RWR1. Pole RWR1–5 disconnects relay RWR2 from capacitor 318 and connects capacitor 318 to the +400 volt supply, and capacitor 318 charges to approximately 400 volts.

After RWR1 has been energized, relay pole RWR1–2 applies power to both windings of the supply motor. Poles RWR1–3 and RWR1–4 reverse the connections to the capacitor winding RCW of the take-up motor. In the Rewind position of switch FRW, power to this winding is supplied through RWR1–2, FRW–2, RWR1–3, RWR1–4, RWR2–3, and MS–2. Power for the resistor winding is applied through RWR1–2, FRW–2, and MS–2. The motors turn in the reverse or counterclockwise direction.

The left motor, direct-connected to its reel hub, receives full power; the right motor, geared three-to-one to its reel hub, is powered through resistors. The free-running speed of each motor is 1800 R. P. M., but friction and drag reduce the speed of the motors to a lower value.

When the tape rewinding is completed, rubber tape terminations (stop bumps) on the tape leader close the "bump detector" switch MS–1. This by-passes relay coil RWR1 to ground through resistor 312. Relay RWR1 drops out. Capacitor 318 discharges through RWR1–5 energizing relay RWR2 for several seconds. Pole RWR1–2 removes rewinding power from both motors; but poles RWR2–1 and RWR2–2 supply take-up, forward direction, power momentarily for the right motor. RWR2–3 increases the capacitance on this motor. When capacitor 318 has discharged, relay RWR2 drops out and all power is finally removed from the right motor.

III. READING HEAD AMPLIFIERS AND INFORMATION STORAGE, FIGS. 4 AND 5

The reading head assembly consists of eight head coils and their copper encasements, a special flat mounting plate, and three tape guides. The parts are aligned and sealed on the mounting plate to preserve the alignment of the tape as it passes over the pole piece surface. The reading head has a magnetic shield over the pole piece surface. This shield can be snapped into or out of place. See Figure 2 for a showing of the reading head.

Eight head amplifiers, one for each channel, are located in the tape reader. The head amplifiers are all identical and only one is shown in Figure 4. Each head amplifier has a voltage transformer 420, two pentodes, 421 and 422, in cascade and a cathode follower tube 423. The amplifier has a current feedback loop from the cathode follower stage to the first pentode 421. All the pentodes in the head amplifiers operate class A. Each head amplifier connects to one of eight thyratrons 525—530, 431 and 432, one for each channel, located in the tape reader and shown in Figures 4 and 5. These thyratrons energize the function table relays in the printer dolly.

When the timing relay is de-energized, as will be explained, a positive signal pulse from a head amplifier can fire a thyratron. All channels that develop positive pulses do so at very nearly the same time. The current from all the triggered thyratrons passes through resistor 433 in the common cathode circuit. The increase in current through resistor 433 causes an increase in voltage across it. This voltage increase is stepped up by an audio transformer 434. The voltage change developed in the secondary of this transformer is the set-up pulse which triggers the motor flip-flop, as will be described hereinafter.

The clear relay pole selects the voltage for the thyratron anode circuit. During set time of the clear delay flop, the clear amplifier energizes the clear relay, as will be explained hereinafter. Then the clear relay pole momentarily connects the thyratron anode circuit to a −149 volt supply, bringing all the thyratrons to the nonconducting condition. When the clear relay is once more deenergized, the clear relay pole connects the thyratron anode circuit to a +400 volt supply, so that the thyratrons will conduct if they are triggered by positive pulses on their grids.

Timing relay pole 6 decreases the screen voltage on the thyratrons when the relay is energized. The timing relay itself is described hereinafter. Normally, the common line for the thyratron screens returns to ground through resistor 435. When the timing relay is energized, its pole 6 connects the common screen line direct to a −101 volt supply. With the thyratron screens at −101 volts rather than ground potential, the thyratrons cannot be fired by the positive pulses of the magnitude usually received from the head amplifiers.

Neon lights 436 and 536 are provided for the function table thyratrons. Neon lights 437 and 537 in the printer dolly are duplicates of the function table thyratron neon lights. When a neon light is on, the corresponding channel relay is energized by its thyratron which was fired by a signal from the magnetic tape.

IV. DECODING FUNCTION TABLES, FIG. 6

The function table decodes the pulse combinations on the magnetic tape. A "one" from a certain channel on the tape energizes the function table relay or relays for that channel. The wiring diagram for the function table relay poles, which are arranged in a folded whiffletree circuit, is shown in Figure 6. The channel numbers are in vertical rows at the sides of the drawing.

The function table relay contacts must carry the actuator current, but the contacts are not used to make or break the circuit while current is flowing. A 20-millisecond delay flop (one-shot multivibrator) prevents the flow of actuator current until the final circuit is set up by the function table, and the clear delay flop does not clear the function table thyratrons until the end-of-print pulse occurs.

When the sprocket channel relay is energized, the SP relay pole connects the function table whiffletree circuit to ground. The other end of the whiffletree circuit connects to a typewriter keyboard actuator or to some line which controls typewriter operation.

Figure 10:
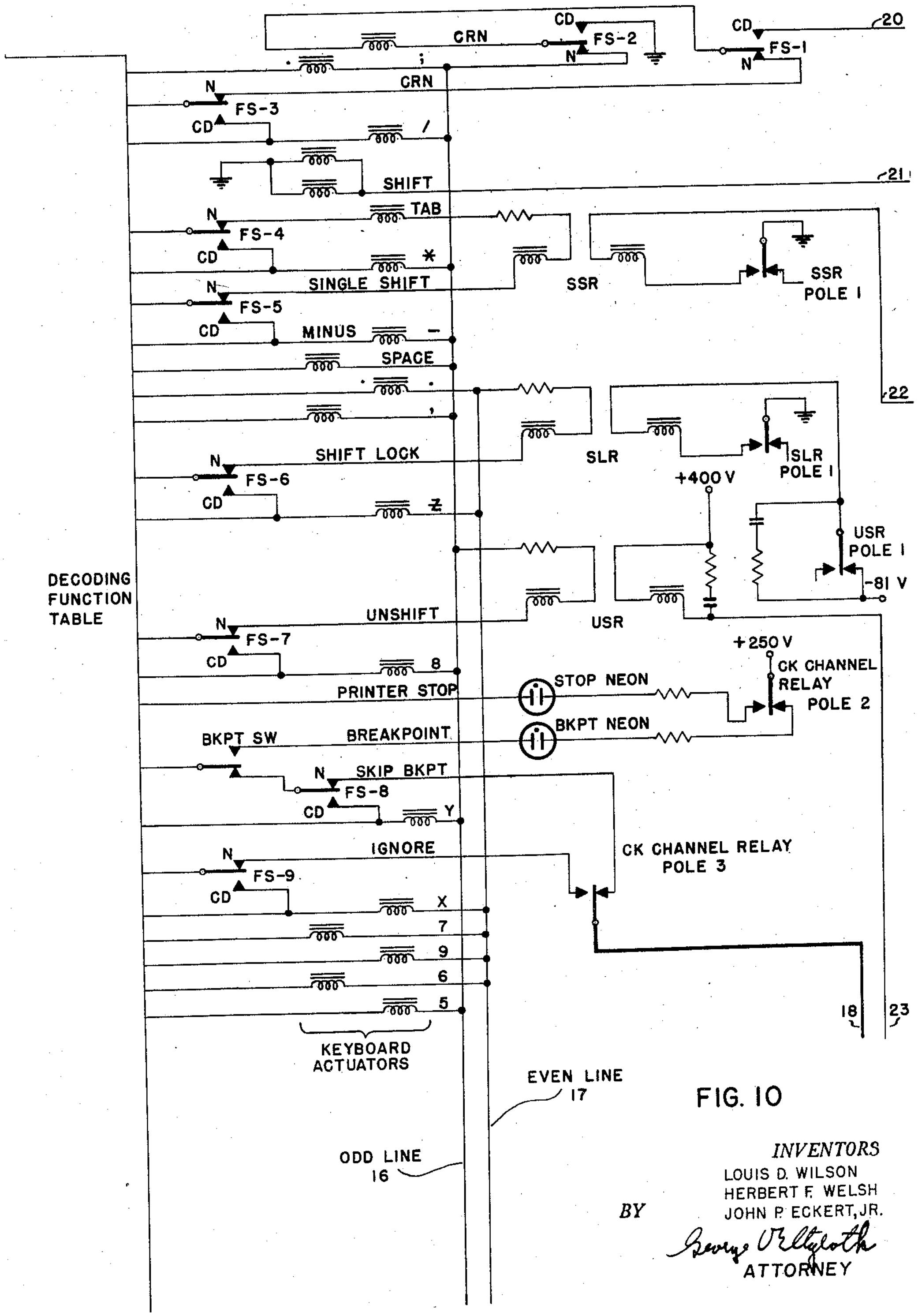

The typewriter keyboard actuators are located under the keyboard of an electric typewriter. Each typewriter keyboard actuator is connected either to the odd line or to the even line, in accordance with the pulse combination code, as shown in Figures 9 and 10. When a keyboard actuator is energized, the actuator armature triggers a corresponding type bar mechanism. The motor-driven power roller in the typewriter moves the type bar to the platen to type the character. For approximately the last inch of travel of the type bar tip, the type bar continues on its own inertia, because the power roller impulse has ceased by then. When the tip of a type bar approaches closer than about a quarter of an inch to the platen, the carriage advances half a space. The carriage advances the second half-space when the tip of the type bar moves farther than a quarter of an inch away from the platen, after typing the character.

When the tip of a type bar retreats to about a quarter of an inch from the platen, a lever at the center of the typewriter releases the arm of the printer action switch, as shown in Figure 12. This connects the PAS capacitor 1240 to the line leading from resistor 1241. The capacitor 1240 discharges its +400 volts potential through resistor 1241 and pulses the line. Resistor 1242, on the ground side of capacitor 1240, limits the discharging current when the capacitor is discharged through the margin switch. With the function switch set to Normal, the MRS closes when the carriage reaches the margin stop. Resistor 1243, on the +400 volt side of capacitor 1240, limits the capacitor charging current when the PAS is released by the return of the type bar.

The arm of the tabulation switch operates during tabulation the same way that the PAS operates during the typing of characters.

The arm of carriage return switch is down for the duration of a carriage return. Like the PAS and the TABS, the CRNS sends out a pulse after its operation is completed.

The arm of the shift switch moves every time the type segment shifts or unshifts. The shift switch sends out a pulse every time the shift switch arm moves.

All of the typewriter functions that are controlled by actuators can be controlled also by the corresponding typewriter key or bar, if the typewriter switch is on and the typewriter motor is running. Manual operation of the printer dolly typewriter is no different from that of a standard electric typewriter, except that the impression control mechanism is internally adjusted for maximum typing pressure. The printer dolly typewriter can use any of three tracks on the typewriter ribbon. The choice is made by setting the ribbon position indicator. The stencil setting removes the ribbon from the typing area. Tabulation stops can be set by moving the carriage to the desired position and then pushing down on the "tab set" key. A carriage return with the "tab clear" key down will clear all the tabulation settings. Margin settings can be made at the typewriter.

V. CENTER DRIVE MOTOR CONTROL CIRCUITS, FIGS. 7, 8 AND 9

The motor flip-flop, shown in Figure 7, in "motor on" condition, can be triggered by pulses which pass through buffer-amplifier tubes 745 and 746. The "set-up" pulse from the transformer in the thyratron cathode circuit is differentiated by capacitor 747 and resistor 748 before it reaches buffer-amplifier tube 746. Another input to tube 746, from FS–12 through resistor 749, becomes active only when the printer is connected to an electrical input system which records and stores coded information in the form of pulses on a magnetized tape so as to make a typewritten record thereof. The interaction of the printer and the electrical input system will be described hereinafter. The "set-up" pulse triggers the MFF tube 750, a twin triode tube, to "motor off" condition.

The other pulse input to the MFF is the clear signal from the clear relay pole. This signal is attenuated and differentiated before it reaches the buffer-amplifier 745. The potential divider formed by resistors 751 and 752 reduces the 550-volt swing of the clear signal to a value suitable for buffer-amplifier 745. Capacitor 753 compensates for the capacity to ground of the circuit comprised of resistor 752, capacitor 754, resistor 755, grid resistor 756, and buffer-amplifier 745. Thus the attenuator circuit has an esentially flat frequency response. The differentiator, consisting of capacitor 754 and resistor 755 converts the clear signal change-of-voltage into a clear pulse.

All of the output signals and pulses from the MFF are taken from the two flip-flop anode circuits. From the anode of tube section 750*a*, a signal passes through resistor 757 to the timing relay amplifier, tube 871 (Fig. 8), and a pulse passes through capacitor 758 to the 20-millisecond delay flop, tube 884. From the anode of tube section 750*b*, a signal can go through resistor 759 to the CDM relay amplifier, tube 775, or through resistor 760 to the print gate, tube 906. The elements to which the MFF outputs are directed will each be described hereinafter.

Two switches are associated with the circuit of the grid of section **750*b* of the MFF. These are the clear switch and the "tape-too-short" switch. The "tape-too-short" switch is one of the tape panel switches discussed in describing the reel motor circuit. If either of these switches opens, the −149 volt bias potential is disconnected from the 750*b* grid circuit, and the grid of 750*b* then has only the connection to +250 volts through resistors 761 and 762. In this case the 750*b*** section of the MFF conducts, and the MFF is locked in the "motor off" condition. These switches will also lock the printer action FF so that it inhibits the print gate, as will be described hereinafter.

Assuming that the MFF is in the "motor on" condition, as shown, the section **750*a* of the MFF tube will be conducting, and its anode voltage will be down. The grid of the other tube section 750*b* is connected to a voltage divider circuit, resistors 762 and 763, which has its higher voltage connection to the anode of section 750*a*. Since the grid of section 750*b* is then at about −81 volts, the 750*b* section of the MFF tube is not conducting. The grid of section 750*a* is connected to a voltage divider, resistors 764 and 765, whose higher voltage connection is to the anode of section 750*b***, the anode of the nonconducting section. The grid of the conducting section is therefore at a higher voltage than the grid of the nonconducting section.

A positive pulse entering buffer-amplifier tube 746 causes this tube to conduct for the duration of the pulse. Tube 746 draws current through resistor 766 and lowers the voltage at its anode and the anode of MFF tube section **750*b*. If the positive pulse arriving at tube 746 is sufficiently strong, the lowered voltage at the anode of section 750*b* permits the grid of section 750*a* to become more negative than the grid of section 750*b*. This effect is aided by the rise of voltage at the anode of section 750*a* when the current in section 750*a* decreases because its grid is more negative. The rise in voltage at the anode of section 750*a* makes the grid at section 750*b* become more positive. By the time tube 746 has again become nonconducting, MFF tube 750 has shut off its section 750*a* and has set up conduction through its section 750*b***.

A positive pulse arriving at buffer-amplifier tube 745 will set up the reverse process.

The timing relay coil, shown at the top center of Figure 8, is energized by plate current from any one of three amplifiers. One of the amplifiers, tube 871 is biased to the conducting state when the motor flip-flop is in the "motor off" condition, which was previously described. Another amplifier, tube 870, conducts while the 350-millisecond delay flop in the timing circuit is set. A third amplifier, tube 872, responds to a positive bias received from the photoelectric circuit. The timing and photoelectric circuits will be described hereinafter.

The timing relay has six poles, three of which are effective only when the printer is connected to an electrical input system. The other three poles are connected as follows: pole 1 (Fig. 8) is associated with the ignore delay flop; pole 3 (Fig. 15) is in the timing circuit; and pole 6 (Fig. 4) is in the screen circuit of the thratron line. The functions of poles 1 and 3 are described hereinafter.

The plate current of amplifier tube 775, shown in Figure 7, energizes the coils of the two center drive motor relays when the motor flip-flop is in "motor on" and biases tube 775 to conduction. The CDM coils are in series, paralleled by a hash filter, resistor 776 and capacitor 777, and a neon light circuit, 778.

With the CDM relays energized, their relay poles connect each winding of the 2-phase center drive motor to its 30-volt, 69-cycle supply. A dummy load is connected to the 90° phase supply while the CDM itself is disconnected. The dummy load is adjustable resistor 779. The CDM relay poles have resistor-capacitor hash filters.

A capacitor 780 discharging through the two CDM windings in series brings the CDM to a rapid stop. While the CDM relays are energized and the motor is running, capacitor 780 charges up to about 200 volts through resistor 781. When the CDM relays are de-energized, this capacitor is shunted by the two windings of the motor and resistor 782, all in series. After the capacitor discharges through this circuit, the power supply furnishes a steady-state current of about one ampere.

The 20-millisecond DF, shown in Figure 8, receives a positive-going signal from the motor flip-flop through line 10 when the MFF responds to a "motor off" or "set-up" pulse. This positive-going signal is also the one that biases the timing relay amplifier 871 through line 9 into the conducting state.

This positive-going signal from the MFF is differentiated by capacitor 758 and resistor 883 to provide a setting pulse for the normally nonconducting section of the 20-millisecond DF tube 884. When the 20-MS delay flop is set, the anode voltage of the normally conducting section **884*b* rises, and neon light 885 is extinguished. This voltage rise is the positive-going output signal from the 20-MS DF to print gate tube 886. The grid of tube 886 is direct-coupled through resistor 887 to the output anode of 884*b*, so that tube 886 conducts during the entire time that the 20-MS DF is set. The effect of this on the print gate will be discussed hereinafter. The other output signal from the 20-MS DF goes through capacitor 888** to the ignore gate.

The ignore gate prevents triggering of the ignore delay flop except when the ignore line is grounded through the function table or through the skip switch. The chief elements in the ignore gate are resistors 889, 890, 891, 892 and 893. These resistors constitute a voltage dividing network between +20 volts and +250 volts. The junction point between resistors 890 and 891 is connected to the grid of tube 894, a normally-conducting amplifier which can shut off and send a positive triggering pulse to the ignore delay flop. Unless the junction point between resistors 892 and 893 is grounded, the voltage divider will maintain the tube 894 grid sufficiently positive so that the tube will not be triggered into nonconduction by pulses from the 20-MS DF or the GO2 switch.

The pulse from the 20-MS DF enters the voltage divider network between resistors 889 and 890. If pole 2 of the stop switch is open (switch set to Stop), the incoming pulse is attenuated by resistor 895 so that the pulse is ineffective. The GO2 switch pulse enters the voltage divider network between resistors 891 and 892.

The voltage divider junction point between resistors 892 and 893 is connected to the ignore line 19 which can be grounded through the function table or through the skip switch. Grounding the ignore line applies +250 volts across resistor 893 and drops the 892—893 junction to ground potential. With the 889, 890, 891, 892 voltage divider network thus across 20 volts, the grid of tube 894 is held at +10 volts, and negative pulses of 23 volts or more will cut off tube 894. The GO2 switch pulse is −149 volts, but the pulse is reduced by the 891—892 network so that the pulse is about −27 volts by the time it reaches the tube 894 grid. The 889—890 combination reduces the 20-MS DF pulse in a similar manner.

Tube 894 responds to a negative pulse by cutting off for an instant. This raises its anode potential momentarily. The sudden upward shift of anode voltage of tube 894 is transferred to the input grid of the ignore delay flop tube section **896*a* by way of capacitor 897 and resistor 898**. This triggers the ignore delay flop into the "set" condition.

While the ignore DF is set, the anode voltage of section **896*b* is at a higher potential. This raises the grid potential of tube 899**, one of the print gate elements. This in turn places an inhibition on the print gate.

The ignore DF cathode current through resistor 800 decreases when the ignore DF changes from restore to set in response to a triggering pulse. This sudden decrease in total cathode current drops the cathode voltage rapidly. The network resistor 901-capacitor 902 (Fig. 9) differentiates this voltage change and transmits it as a negative pulse to tube 903. This cuts off tube 903 momentarily, so that tube 903 develops a positive pulse at its anode. This positive pulse, which originated at the triggering of the ignore DF, can trigger the clear delay flop.

The clear delay flop, shown in Figure 9, turns on the clear relay amplifier 904 during clear DF set time. This energizes the clear relay, whose pole temporarily switches the anodes of the function table thyratrons from +400 volts to −149 volts. Either an end-of-print pulse or a pulse from the ignore delay flop and tube 903 can trigger the clear delay flop. A special network at the clear DF input compensates for variations in tube characteristics due to aging. The operation of the clear delay flop is the same as the ignore delay flop, described hereinabove.

During the time that the clear DF is set, the clear DF biases tube 904, the clear relay amplifier, to conduction. This energizes the clear relay. The clear DF remains set for five milliseconds, and the clear relay has about three milliseconds switching time, hence there is about eight milliseconds time between the clear DF trigger pulse and the restoration to normal of the clear relay pole.

The print gate (Figs. 8 and 9) is in the circuit between the printing rate control and the print delay flop. When the last inhibition is removed from the print gate, the gate raises the voltage at the input grid of the print DF (Fig. 9), thereby setting the delay flop. The voltage at the input grid of the print DF, and therefore at the cathode of tube 905, is +20 volts for the normal, restored, condition. This voltage cannot rise unless the anode-grid potential of print gate tube 905 becomes more positive than +20 volts. As long as at least one of the tubes 886, 899, or 906 is conducting, the anode and grid of tube 905 are essentially at −49 volts, far more negative than the +20 volts at the tube 905 cathode. Tube 886 conducts when the print gate is inhibited by the 20–MS delay flop; tube 899 conducts when the ignore delay flop is inhibiting; and tube 906 conducts when either the motor flip-flop or the printer action flip-flop inhibits. While the print gate is inhibited, the anode and grid of tube 905 are held at nearly −49 volts, which is the cathode potential of the conducting, inhibiting tube or tubes. All the elements of tube 807, the printing rate control tube, are also at −49 volts, and the ungrounded terminal of capacitor 808 is likewise at −49 volts.

Immediately after the last print gate inhibition is removed, charging current flows to capacitor 808 from the +250 volt supply through the potentiometer 869, resistor 809 and resistor 810. The voltage drop which develops across resistor 810 biases tube 807 positively, so that the charging rate of capacitor 808 is dependent mostly upon resistor 809 and the setting of the potentiometer.

The anode potential of tube 807 is essentially the same as the voltage of the ungrounded side of capacitor 808. As soon as this potential rises much above +20 volts, tube 905 (Fig. 9) conducts, thereby raising the voltage of the input grid of the print delay flop.

When one or more of the tubes 886, 899 and 906 conducts, the print gate is once more inhibited. Current for the inhibiting tube or tubes, is supplied by the +250 volt supply through potentiometer 869 and resistor 809, and by discharging current from capacitor 808 through resistor 810. This discharge current through resistor 810 biases tube 807 negatively, so that, in effect, capacitor 808 discharges to −49 volts through resistor 810 and one or more conducting, inhibiting tubes.

The print delay flop, tube 911, is triggered by a rise in potential of the cathode of tube 905 in the print gate. This rise in potential enables the 911*b* section to conduct and to shut off the 911*a* section. The resulting voltage rise at the tube section 911*a* anode triggers the printer action flip-flop into the condition of inhibiting the print gate at tube 906. When the print gate is inhibited, the cathode voltage of tube 905 drops, removing the more positive voltage from the input grid of the print delay flop tube 911. Thus the print delay flop removes its triggering signal very shortly after the signal has become effective.

For the thirty milliseconds that the print DF remains set, the delay flop biases the print relay amplifier, tube 912, so that the tube 912 conducts, energizing the print relay.

Although the clear gate and the print relay amplifier are shown separately on the block diagram, they are actually combined in tube 912. Except when the clear switch is in Operate rather than Clear, the print delay flop can bias tube 912 to the conducting condition, thereby energizing the print relay. When the clear switch is set to Clear, pole 2 of this switch disconnects the screen grid of tube 912 from its +100 volt supply, and the tube cannot conduct sufficiently for the PR to be energized. The screen grid of tube 912, therefore, corresponds to the clear gate on the block diagram.

VI. PRINTING CONTROL CIRCUITS, FIGS. 10, 11, 12 AND 13

Figure 11:
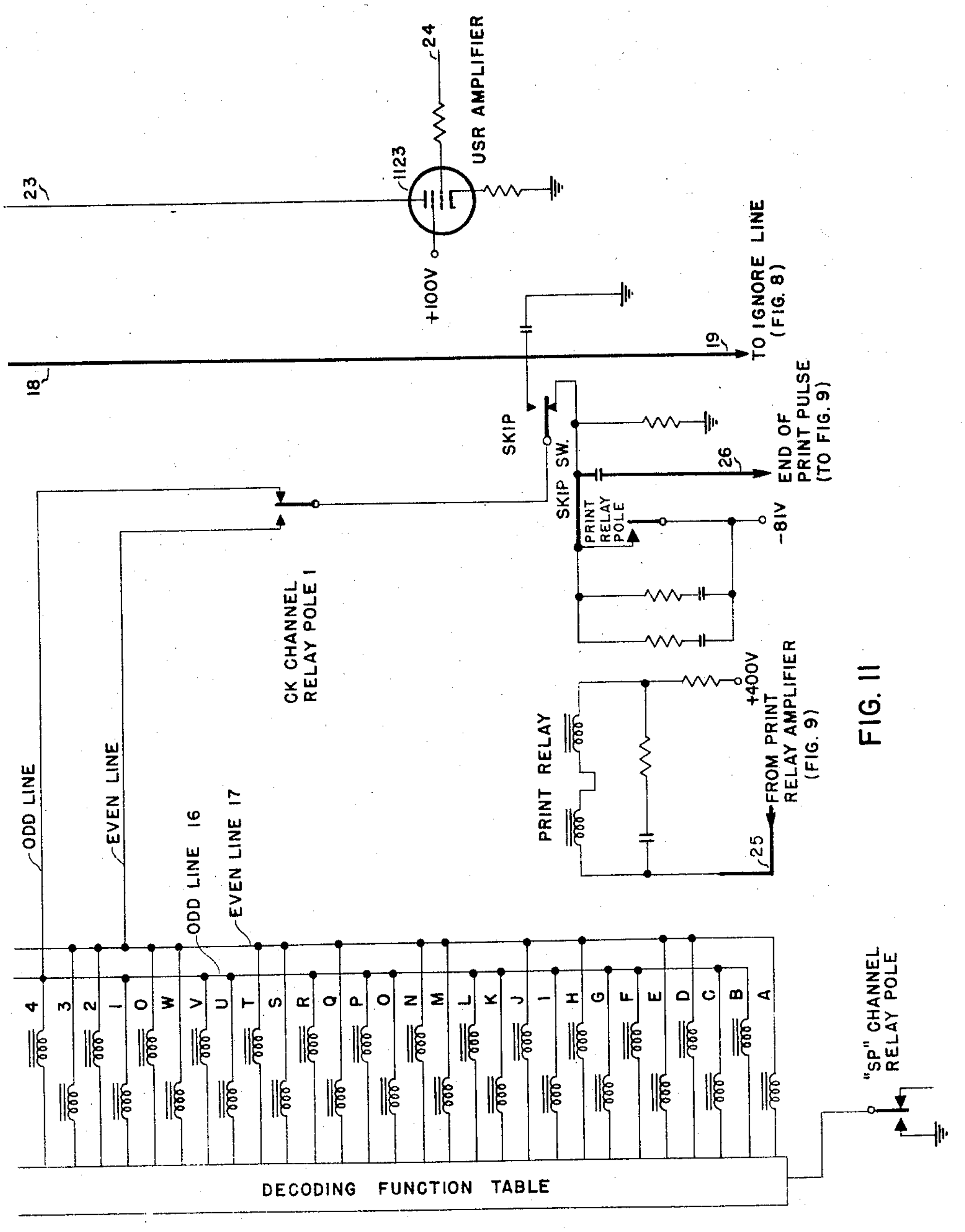

The pole of the print relay and the PR itself are shown in Figure 11. The print relay coil is shunted by a hash filter. The print relay pole completes the typewriter actuator circuit by connecting the actuator line to a −81 volt supply. The print relay pole is shunted by hash filters.

The printer action flip-flop places an inhibition on the print gate immediately after the print delay flop is triggered. The printer action FF can be locked into the inhibiting state by the clear switch, or by the tape-too-short switch. Except when it is locked into this condition, the printer action flip-flop responds to pulses from pole A of the GO2 switch or to pulses from the printer action line.

The printer action flip-flop prevents any attempt to type a character before the printer has completely finished with previous tape character. Tape characters such as carriage return, shift, and others require extra time for completion. The printer action flip-flop also adjusts the speed of operation according to the condition of the typewriter mechanism.

The printer action flip-flop releases its inhibition on the print gate whenever the printer action FF receives a pulse from the printer action line. Ordinarily a printer action line pulse will occur before the next tape character is set up in the thyratron line. Therefore, ordinarily the last inhibition to be removed from the print gate is the one from the 20–MS DF. However, in the case of carriage return and other similar operations, the printer action pulse occurs after the 20–MS DF has restored itself. Then the printer action FF inhibition is the last to be removed from the print gate.

Tube 913 is the printer action flip-flop tube, and the two tubes 916 and 917 are buffer-amplifiers. Locking of the printer action flip-flop is accomplished by not providing a −149 volt return of the grid circuit of tube section 913*b*. This leaves the grid of section 913*b* connected to +250 volts through resistors 914 and 915, so that the section 913*b* is locked in the conducting state. The electronic locking of the printer action FF affects the motor FF in a similar manner.

The printer action flip-flop is triggered by positive pulses, which causes tube 916 or 917 to conduct temporarily. Tube 917 conducts while the print delay flop is set, thereby raising the voltage at the grid of tube 917. Conduction of tube 917 lowers the potential at the anode of this tube and the grid of tube section 913a. This results in cutting off the section 913a, raising its anode potential, and helping to make print gate tube 906 conduct. Thus the printer action FF responds to the set signal from the print delay flop by inhibiting the print gate. The printer action FF continues this inhibition until a positive pulse reaches tube 916.

Positive pulses for tube 916 come from the printer action line, unless the test switch is turned to Test. A positive pulse makes tube 916 conduct temporarily thereby lowering the voltage at its anode and the grid of tube section 913b. When the pulse time is over, tube 916 no longer conducts, but the 913b section remains nonconducting. This lowers the anode voltage of the anode of tube section 913a. If the anode voltage of the motor flip-flop tube section 750b is low also, print gate tube 906 is nonconducting, and not inhibiting the print gate.

The bounce delay flop, shown in Figure 13, absorbs typewriter switch pulses and transmits them 100 milliseconds later. The bounce delay flop performs this function during carriage return, tabulation, and shifting, to hold up the next typing action until the typewriter carriage has come to rest. During shifting, the bounce delay flop acts also to energize the carriage return and unshift relay which in turn unlocks either the shift lock relay or the single shift relay.

Positive pulses from the CRNS or the TABS trigger the bounce delay flop at the completion of a carriage return or tabulation. While the single shift relay or the margin relay is energized, the bounce DF receives pulses from the printer action switch, also. A positive pulse from the carriage return switch or the tabulation switch reaches the bounce delay flop at the end of either operation. This pulse sets the delay flop for 100 milliseconds. While the delay flop is set, the section 1318a is nonconducting and the anode voltage at this tube section is up. This raised voltage can be used to bias the USR amplifier, tube 1123, positive for 100 milliseconds.

When the bounce delay flop restores itself after 100 milliseconds, the anode voltage at tube section 1318a goes down suddenly. The drop in voltage set up this way is differentiated by capacitor 1319 and resistor 1320. This differentiated drop in voltage pulses tube 1321 into momentary nonconduction and produces a positive pulse at the anode of tube 1321 which is transmitted through resistor 1322 to the printer action line. The bounce delay flop produces a positive pulse in the printer action line when the bounce DF resets while the SSR, USR and MR are not energized.

If the bounce delay flop is to energize the USR in order to bring about an unshifting, the bounce DF output is switched from the printer action line to the USR amplifier, tube 1123, shown in Figure 11. If the typewriter is ending a single shift, pole 3 of the SSR connects the DF to the USR amplifier and SSR pole 4 disconnects the printer action line. If the typewriter is being unshifted from shift lock, USR pole 5 connects the USR amplifier, and USR pole 4 disconnects the printer action line. The positive pulse which triggers the bounce DF in unshifting is supplied by the shift switch, shown in Figure 12, when the unshifting operation is completed.

When the function switch is set to Computer Digit, the printer dolly typewriter does not shift or unshift, and the carriage return and unshift relay operates during carriage returns. At the beginning of a carriage return, the margin relay becomes energized. MR pole 2, shown in Figure 12, switches a PAS pulse to the bounce DF input; and MR–1, shown in Figure 13, connects the DF output to the USR amplifier. The next pulse sent out by the bounce DF, as it restores, will reach the printer action line by way of USR–4. The second setting of the bounce DF results from a positive pulse arriving from the CRNS, shown in Figure 12.

When the grid of the USR amplifier becomes positive, the tube 1123 conducts and, through line 23, energizes a coil of the carriage return and unshift relay, shown in Figure 10. Positive bias for the USR amplifier grid comes from the bounce DF when the DF is set. The circuit from the bounce DF to the USR amplifier includes one or more poles of the USR, SSR, or MR as previously described. This circuit is shunted by a stabilizing resistor 1324 which is effectively a part of the 1325—1324—1326—1327 voltage divider. This voltage divider prevents too negative a bias on the USR amplifier, and insures that when the circuit is completed through the USR, SSR or MR pole path, the initial transient does not restore the bounce DF by lowering the anode voltage of tube section 1318a excessively.

The USR amplifier 1123 can energize one of the coils in the carriage return and unshift relay. The other USR coil can be energized by connections through the printer function table.

The timing circuit, shown in Figure 7, is one of two circuits that enable the central drive motor to operate while the timing relay is energized. The timing relay pole 6, shown in Figure 4, reduces the thyratron screen grid potential and de-sensitizes the thyratron line; two other TR poles are in the timing circuit and in the photoelectric circuit. Ordinarily the TR is controlled by the motor flip-flop; the MFF energizes either the center drive motor relays or the timing relay, but not both.

The first circuit element in the timing circuit is a thyraflop 728. A thyraflop is a delay flop that uses a thyratron which can be retriggered. The delay time of a thyraflop starts from the instant of the last trigger pulse, regardless of the previous condition of the thyraflop. The trigger pulses for the timing circuit are differentated clear signals that also trigger the motor flip-flop into "motor on." Usually these pulses occur frequently enough to maintain the thyraflop in the set condition. Figure 7 shows the timing circuit thyraflop in the "restored" condition.

The clear signals do not appear while the "between-block" tape sections pass over the reading head. Since pulse combinations are not recorded in these sections, the printer finds no characters to type and no function table thyratrons to clear. After 350 milliseconds of this nontriggered operation, the thyratron restores itself. The triggering pulses are positive pulses which cause the thyratron 728 to conduct. The conducting thyratron reduces the charge of capacitor 729 to a low value. This maintains cut-off bias on the pulse shaper tube section 730a.

When the triggering pulses cease, the thyratron 728 no longer is forced to conduct by the temporary positive voltage on the grid. The thyratron cannot maintain itself in the conducting state because of the high resistance of resistor 731 in the anode circuit. When the thyratron does conduct, it draws anode current mostly from the discharge of condenser 729 through resistor 732. While the thyratron is not conducting, condenser 729 charges through resistors 731 and 732. After sufficient charging time, about 150 milliseconds, the grid voltage at tube section 730a rises beyond cut-off, and the tube conducts. This lowers the anode potential of tube section 730a, which is transmitted by capacitor 733 to the grid of tube section 730b, which in turn becomes nonconducting. This raises the anode voltage of tube section 730b. The two sections of tube 730 constitute the pulse shaper, which transforms the rather slow voltage changes from the thyraflop into more rapid voltage changes.

The photoelectric circuit, shown in Figure 8, like the timing circuit, enables the center drive motor to pull tape over the reading head while the timing relay is energized and the thyratron line is de-sensitized. The controlling element of the photoelectric circuit is a light-sensitive resistance element, or photoelectric cell 834. This cell, a variable resistor 835 and a resistor 836 constitute a voltage-dividing circuit whose ends connect to +250 volts and −249 volts. The junction between the cell and the variable resistor is capacity-coupled by capacitor 837 to the grid of a thyraflop tube 838. The thyraflop tube is normally biased for nonconduction.

Light can pass from a shielded lamp to the photoelectric cell when a punched hole in the tape passes between them. These holes are punched in the tape to mark nonprintable sections, such as tape splices. The photoelectric circuit enables the printer to pass these unprinted sections at a tape speed of two inches per second without attempting to read these sections. After two seconds the photoelectric circuit restores itself to the inoperative condition unless another punched hole retriggers it. In that case the photoelectric circuit restores itself two seconds after passage of the last punched hole.

Light shining through the punched hole lowers the resistance of the photocell. This raises the voltage at the voltage-divider side of capacitor 837. This, in turn, raises the potential of the tube 838 control grid momentarily. The thyratron conducts for a while, lowering the voltage at the thyratron anode and discharging capacitors 839 and 840 until they are down to about +15 volts. With the top of the 841—842 voltage divider down to +15 volts, the grid of tube 843 is biased below cutoff and this tube becomes nonconducting.

With tube 843 cut off, its anode potential rises, making the grid of tube 872 sufficiently positive so that tube 872 conducts, thereby energizing the timing relay. The timing relay is energized until tube 843 again becomes conducting. Tube 843 starts conducting when its grid becomes sufficiently positive. Just after thyratron 838 fires, the top of the 841—842 voltage divider is at about +15 volts, and the tube 843 grid is at about −69 volts. Capacitors 839 and 840, shunted by resistors 841 and 842, draw charging current from a +250 volt supply through resistor 844. As capacitors 839 and 840 accumulate their charges, the voltage rises at the top end of resistor 841, and the tube 843 grid voltage rises also. Two seconds time is required before the tube 843 grid potential goes above about −11 volts, at which time tube 843 again conducts. Equilibrium is reached when the top of resistor 841 is at about +90 volts.

Because of the difference in characteristics of different photoelectric cells, the photocell circuit includes a variable resistor 835. This resistor 835 must be adjusted to suit the photocell.

The printer uses delay flops for the 20-millisecond delay and in the ignore, clear, print, bounce, and timing circuits. Each of the printer delay flops uses a twin-triode tube with a common cathode resistor and with unlike anode resistors. Each delay flop requires a positive signal or pulse for triggering the input grid.

The print delay flop, shown in Figure 9, is a typical printer delay flop. This DF involves tube 911. The triode section **911*b* is the input triode, and the triode section 911*a* is the output triode. Normally, the output triode is conducting because its grid is connected through resistors 945 and 946 to a +250 volt supply. The cathode current from the output triode flows through resistor 947, the common cathode resistor. The output triode passes enough current through resistor 947** to bias the input triode to cut-off. Thus, normally the input triode is nonconducting. This normal condition, with the input triode nonconducting and the output triode conducting, is called the "restored" condition.

The print delay flop can be triggered or "set" by making the input grid sufficiently positive to overcome the cut-off bias of the cathode. The triggering of the print delay flop is accomplished by a positive-going signal or pulse.

The output triode current produces about a 60 volt drop across the cathode resistor 947. The output triode grid is near cathode potential, or about +60 volts. Resistors 946 and 945 form a potential divider in which the junction point, point "a" is normally at about +65 volts. This point is connected to one terminal of capacitor 948. The other terminal of capacitor 948 is connected to the anode of the input triode section **911*b***.

When the input triode grid is driven positive (about +50 volts with respect to ground, or about −10 volts with respect to cathode) by an input pulse, the input triode conducts. As soon as the input triode conducts, its anode potential drops from its normal value of +250 volts to about +40 volts. This change of voltage, which takes place very rapidly, thus amounts to a swing of 210 volts in the negative direction. The rapid change of the output triode from conducting to nonconducting, at the instant the delay flop is triggered, suddenly raises the voltage of the output triode anode and causes the delay flop to send out a signal which becomes a positive pulse after differentiation.

During the first instant of this voltage change, capacitor 948 executes exactly the same voltage swing. This drops the potential of the output triode grid 210 volts, from about +60 volts to about −150 volts. This cuts off the output triode, and leaves only the input triode to supply current for the common cathode bias resistor 947. This cathode bias voltage is less, because resistor 949, the input triode anode load, has much higher resistance than resistor 950, the output triode anode load; and the input triode, therefore, conducts less current.

From the time that the output triode grid starts off at −150 volts until it rises to about +30 volts (and then can no longer keep the output triode cut off), the potential of the output triode grid and the potential at point "a" becomes gradually more positive by reason of capacitor 948 drawing current through resistor 946. This time during which the output triode is completely cut off is the time during which the delay flop is "set." The duration of this set time depends upon the time constant of the RC combination 946 and 948. During this set time the input triode is conducting, and the anode of the input triode remains at about +40 volts.

Once the grid of the output triode becomes more positive than cut-off voltage, the output triode conducts more and more current, raising the cathode potential of the input triode, decreasing the current through the input triode, and raising the potential of the input triode anode. Capacitor 948 transmits this voltage rise of the input triode anode back to the output triode grid, hastening the changeover back to the restored condition of the delay flop. The rapid change of the output triode from nonconducting to full conducting, at the end of the delay period, suddenly lowers the voltage of the output triode anode and causes the delay flop to send out a signal which becomes a negative pulse after differentiation.

The time required for capacitor 948 to re-establish its original equilibrium condition (about +250 volts at one terminal, and about +65 volts at the other) is called "recovery time." This recovery time is dependent upon the time constant of the RC networks 945, 948 and 949. If the delay flop is triggered before the end of recovery time, the set time will be less than it should.

Each delay flop in the printer has a neon indicator light connected in parallel with its resistor in the output triode anode circuit. This light is on when the delay flop is in the normal or restored condition.

VII. POWER SUPPLY CIRCUITS, FIG. 14

The printer power supply is shown in Figure 14. All the power of the printer passes through an A. C. on-off switch. Fifty-five seconds after the A. C. switch is turned on, the time delay circuit makes power available to the D. C. power supplies. A D. C. on-off switch can shut off the D. C. power supplies when this is required for maintenance and testing.

Two of the D. C. power supplies are regulated. The typewriter actuator supply has a voltage regulator transformer on the A. C. line side. The power supply for the eight head amplifiers has a sensitive electronic regulator on the D. C. side. This electronic regulator has two controls: the control at resistor 1451 is an adjustment for the D. C. output voltage; and the potentiometer 1452 setting, controls the amount of compensation provided by the regulator.

The 30 volt supply for the 0° phase for the center drive motor is a transformer which steps down the A. C. line voltage directly. The 90° phase supply for the center drive motor has a phase-shifting capacitor in the primary circuit of its step-down transformer.

VIII. OPERATION OF COMPLETE SYSTEM, FIGS. 15, 16 AND 17

The Normal operation cycle of the printer will now be described in connection with the block diagram, shown in Figures 15, 16 and 17. At the beginning of an operating cycle the thyratrons are assumed to be cleared, the motor flip-flop is in the "motor off" condition, and the printer action flip-flop is set to inhibit the print gate. These conditions are set up by a previous operation cycle or by the recommended starting procedure.

The GO1 switch supplies the pulse for setting up the initial pulse combination. The pulse from the GO1 switch takes the place of an end-of-print pulse, which normally appears at the end of every completed operation cycle. In normal position the GO1, Fig. 17, switch charges a capacitor to a positive voltage. When the GO1 switch is operated, the capacitor is discharged into a circuit leading to the clear delay flop. This voltage pulse sets the clear delay flop. The clear delay flop energizes the clear relay for about five milliseconds, and then restores itself.

During the time that the clear relay is energized, the anode circuits of all the function table thyratrons are connected to a negative voltage source to stop conduction. The thyratrons remain nonconducting, after their anode circuits are re-connected to the positive voltage source, until some positive voltage appears on their control grids. De-energizing the clear relay restores the positive voltage to the thyratron anode circuit. Changing the anode circuit line from a negative voltage to a positive voltage introduces a positive-going pulse in the anode line. A differentiator sharpens this pulse. The sharpened pulse passes to the timing circuit and to the motor flip-flop.

The pulse entering the motor flip-flop from the thyratron anode line triggers the MFF into the "motor on" condition. The MFF energizes the center drive motor relays, and the CDM proceeds to pull the magnetized tape across the reading head. The MFF also de-energizes the timing relay which permits the potential on the screens of the thyratrons to rise toward ground, restoring thyratron sensitivity.

When a magnetic pulse combination crosses the reading heads, a voltage wave is induced in the corresponding head channel. Each voltage wave is amplified and delivered to the control grid of the corresponding thyratron. The positive part of the wave fires the thyratron. Once a thyratron is fired, it continues to conduct, even when the control and screen grids go negative. The rapid increase in thyratron current that occurs when the tubes are fired sets up a rapidly increasing voltage across the resistance in the thyratron common cathode circuit. This voltage change is transformer-coupled to the MFF in order to trigger it to the "motor off" condition. The center drive motor relays drop out; the CDM stops; and the tape stops moving across the reading head. The timing relay is energized during the entire time that the MFF is in "motor off." The timing relay pole 6 connects all the thyratron screen grids to −101 volts to desensitize them. The thyratrons are connected in series with the actuating coils of the decoding function table relays. When a thyratron conducts, the thyratron current energizes the corresponding relay coil or coils. In this way, the magnetic pulse combination that was found on the tape develops its counterpart in the decoding function table; for every "one" on the magnetic tape there is an energized relay in a corresponding channel of the function table; conversely, for every "zero" on the tape, there is a de-energized relay in the function table. The relay poles in the function table, shown in Figure 6, are arranged in a folded whiffletree circuit. The single input line of the whiffletree is grounded; the multiple output lines are connected to the typewriter actuators. The actuators, in turn, are each returned to one of two lines, the odd line and the even line, either of which may be connected to a −81 volt supply by way of the skip switch and the CK channel relay pole 1.

When the MFF is triggered to "motor off," the voltage rises on the line from the MFF to the 20-millisecond delay flop. The voltage change passes through a differentiator and sets the 20-millisecond delay flop. The voltage change from the MFF also energizes the timing relay. While the 20-millisecond delay flop is set, it inhibits the print gate to insure that no printing action is attempted during the time that the function table relays are setting up. The print gate may also be inhibited at this time by the ignore DF or by the printer action FF. The printer action FF will inhibit the print gate until the flip-flop is restored by a printer action pulse or by a pulse from the GO2 switch. If neither of these pulses has restored the printer action FF, the printer will stop at this point in its operation cycle. When the print gate opens, the printing rate control sets the print delay flop. The print DF remains set for thirty milliseconds, energizing the print relay. A pulse, sent out by the print DF when it sets, again sets the printer action FF. A new printer action or GO2 pulse is required before another character can be printed.

The next events in the operation cycle occur in a parallel fashion. One sequence requires about thirty milliseconds and comprises restoration of the print delay flop, deenergization of the print relay, and generation of the end-of-print pulse at the PR pole. The other sequence requires about sixty milliseconds and comprises energization of the print relay, energization of a typewriter actuator, generation of a printer action switch pulse, and restoration of the printer action flip-flop. At the start of the first sequence, the pole of the print relay completes an electrical circuit from ground through the function table poles, through a typewriter actuator, through the odd line or the even line, through pole 1 of the CK channel relay, and through the skip switch to a −81 volt supply.

The checking relay is energized for all code combinations which have a "one" in the check pulse channel. Therefore, the actuator of any character that has a check pulse is connected to the even line, while each actuator for a character having "zero" in the check channel is connected to the odd line. These two lines are connected to CK–1. If any combination sets up which does not obey the odd-even system, the actuator circuit is incomplete.

The print delay flop restores after thirty milliseconds and drops out the print relay. If the circuit through an actuator is complete, the voltage on the CK–1 line rises rapidly from −81 volts to ground potential. This voltage rise passes through a differentiator and becomes the end-of-print pulse. The end-of-print pulse passes through Test Switch pole 1 to the clear delay flop. The end-of-print pulse replaces the GO1 switch pulse which started the printer on its first operation cycle.

The second sequence of events starts at the same time as the first, with the energizing of the print relay. The PR pole, in turn, energizes a typewriter actuator, which triggers a typewriter type bar mechanically. As the type bar approaches the platen, a bail in the typewriter moves the arm of a miniature switch. This switch is the printer action switch. The PAS is shown with the other typewriter switches. On the upstroke, the type bar moves the PAS lever so that a capacitor terminal is switched to a +400 volt supply line. On the type bar downstroke, the capacitor terminal is switched to a line leading through several relay poles and switches to the printer action flip-flop. The pulse sent out by the PAS restores the printer action FF. This completes the second of the two sequences that occur parallel in time.

The printer starts its next operation cycle at the end of the first sequence, when the end-of-print pulse triggers the clear delay flop, which in turn clears the function table and turns on the center drive motor. Thus, the printer starts searching for the next tape character after the first sequence is finished, but before the second sequence has ended. The PAS pulse that appears at the end of the second sequence restores the printer action flip-flop and removes its inhibition from the print gate, enabling the next operation cycle to begin.

The tabulation and carriage return code combinations are set up and decoded like the alphabetic characters. However, these operations do not yield pulses from the PAS at their completion. Instead, the tabulation switch or the carriage return switch sends out a pulse at the end of the TAB or CRN operation. Instead of passing directly to the printer action FF, as did the PAS pulse, the TAB or CRN pulse sets the bounce delay flop. One hundred milliseconds later the bounce DF restores itself, transmitting the delayed TAB or CRN pulse through some relay poles, an amplifier, the printer action line, and some switches, to the printer action flip-flop. The bounce DF holds up the typing action until the typewriter carriage has come to rest.

If the setting of the margin stop does not permit sufficient travel of the typewriter carriage, the carriage will reach the margin stop before a carriage return pulse combination occurs. When the carriage reaches the margin stop, the margin switch on the typewriter is changed. This MRS is used regularly when the function switch is set to Computer Digit, as will be described hereinafter. With the Normal setting of the function switch, the MRS short-circuits the PAS pulse when the carriage reaches the margin stop. This interrupts the operation cycle and stops the printer. The margin stop must be reset and a GO2 switch pulse must be provided in order to put the printer back into operation.

When the function table relays are set up with the pulse combination for single shift, one coil of the single shift relay is energized for the thirty milliseconds that the print delay flop is set. Pole SSR–1 energizes a second SSR coil, which acts as a holding coil after the current ceases to flow through the first coil. Pole SSR–2 connects the shift actuators to the −81 volt power supply. Capacitor C supplies the shift actuators with a high initial current; resistor RH limits the holding current through the shift actuators to a value less than the initial current. Meanwhile, an end-of-print pulse was set up when the PR pole disconnected the actuator circuit at the end-of-print delay flop time. The CL relay cleared the single shift pulse combination from the function table. The next character from the tape is then set up in the function table. When the type segment shifts, it changes the Shift typewriter switch. The pulse from the Shift switch restores the print gate. The character in the function table is typed, thus giving rise to another end-of-print pulse. This end-of-print pulse starts the sequence of operations which transfers the next tape character to the function table.

The PAS pulse from the typed character is routed through pole SSR–5 to the bounce delay flop. Pole SSR–4 prevents the PAS pulse from entering the printer action line. By way of pole SSR–3 and an amplifier, the bounce DF energizes the unshift relay for one hundred milliseconds. Pole USR–2 short-circuits the holding coil of the SSR, thereby de-energizing the SSR. Pole SSR–2 disconnects the shift actuators and discharges capacitor C rapidly through resistance RD, so that the capacitor will be ready to pass a large initial current again, if another single shift operation should occur immediately. The Shift switch is changed again during the unshifting movement of the typewriter type segment. The pulse from the Shift switch restores the printer action flip-flop. The new character in the function table is printed, and the printer operation cycles continue.

The shift lock function is carried out in a manner similar to the single shift function; but in shift lock operation, the shift lock relay is used rather than the single shift relay. In shift lock the type segment remains in the shifted position and types shifted characters until an unshift instruction returns the type segment to the unshifted position. The function table current energizes the shift lock relay. The SLR has two poles. Pole SLR–1 closes a circuit through the SLR holding coil. Pole SLR–2 energizes the shift actuators, in the same manner as the SSR–2 switch did during the single shift operation cycle. Again, the shifting of the type segment moves the Shift switch. The pulse from this switch restores the printer action flip-flop and permits the printer to type the character in its function table. Characters are typed in the shifted position until the printer receives the pulse combination for unshift.

In the unshift operation cycle the function table current energizes the unshift relay. When pole USR–1 opens, the SLR is de-energized, and pole SLR–2 disconnects the shift actuators. The typewriter type segment returns to the unshift position, moving the Shift switch in the process. A pulse from the Shift switch resets the printer action FF, so that the printer can type the character that was set up in the function table while the typewriter was unshifting.

The ignore pulse combination energizes function table relays only in the sprocket and check channels. As soon as this pulse combination is set up in the function table, the ignore line is effectively connected to ground, and the ignore gate is opened. This grounding of the ignore line produces the equivalent of the end-of-print pulse in other operation cycles. After waiting for the function table relays to stabilize, the 20-millisecond delay flop restores itself and sends a pulse to the ignore gate. This pulse passes through the open ignore gate to set the ignore delay flop. The ignore delay flop immediately sends out a pulse to the clear delay flop and places an inhibition on the print gate for forty milliseconds. The CL delay flop energizes the CL relay, which clears the function table and starts the printer searching the tape for the next character. Timing relay pole 1, which is open during "motor off," closes when the motor FF turns on the center drive motor to search for the next character. TR–1 forces the ignore delay flop to restore before the normal interval is completed.

The ignore operation cycle does not change the printer action FF, the print DF, or the print relay. The ignore operation cycle takes about half as much time as a normal typing operation cycle. Pole 2 of the stop switch can interrupt the ignore operation cycle by stopping the pulse from the 20-millisecond delay flop from entering the ignore gate. This prevents clearing by the CL relay. This 20-MS pulse can be replaced later by a pulse from the GO1 switch or from pole B of the GO2 switch.

Both the printer breakpoint and the printer stop pulse combinations interrupt the operation cycle by preventing the end-of-print pulse or its equivalent. This pulse must be replaced by a GO1 switch pulse, and a GO2 switch pulse must follow, in order to put the printer back into operation.

The breakpoint is disregarded unless the breakpoint switch is set to BKPT and the function switch is in Normal. The printer stop pulse combination can never be disregarded. When the printer breakpoint switch is Normal, the breakpoint operation cycle is similar to the ignore operation cycle. However, when the breakpoint and function switches are set to observe the breakpoint, both the printer breakpoint cycle and the printer stop cycle are the same. In either the breakpoint or the stop cycle, the printer is halted by the absence of an end-of-print signal or its equivalent. Both cycles end with a circuit established through an indicating neon light on the printer dolly control panel.

The timing circuit prevents the printer from reading the hash pulses which may exist in blank spaces on tapes. Except when the timing circuit of the photoelectric circuit is in operation, the timing relay is de-energized and the thyratron line is sensitive to pulses which occur during the time that the center drive motor pulls tape over the reading head.

The clear pulses set up in reading characters occur frequently enough to keep the timing circuit thyraflop set. One hundred and fifty milliseconds after the clear pulse from the last character, the timing circuit thyraflop restores itself. If the motor FF is in "motor on," timing relay pole 3 passes the differentiated restoring pulse from the thyraflop. This pulse sets the 350-millisecond delay flop, which in turn energizes the timing relay for three hundred and fifty milliseconds. Timing relay pole 6 desensitizes the thyratron line during that time.

The photoelectric circuit enables the printer to pass marked sections of unprintable tape. Unprintable sections, such as tape splices, are marked by holes punched through the tape at the beginning of the sections. Light shining through one of these holes changes the resistance of a photocell in the circuit. This triggers the thyraflop, which energizes the timing relay for a period of two seconds. This thyraflop can be retriggered again for an additional delay period of two seconds, even if the thyraflop has not restored itself in the meantime. If the center drive motor is operating, the printer is likely to reach the recorded part of the tape fom one to five seconds after the photoelectric circuit has become inactive.

The stop switch halts printer operation by interrupting the operation cycle. Pole 1 of the stop switch is used in the character-typing cycles, and pole 2 is effective when the skip switch is in Skip or when the printer is reading ignore pulse combinations.

When stop switch pole 1 opens, the pulse from the printer action line cannot reach the printer action flip-flop to restore it; consequently, the print gate remains inhibited and the print relay is not energized. The pulse interrupted by pole 1 of the stop switch can be replaced by a pulse from pole B of the GO2 switch, to put the printer back into operation. When stop switch pole 2 opens, the restoring pulse from the 20-millisecond delay flop cannot trigger the ignore delay flop, which in turn cannot then operate the clear relay. The pulse interrupted by pole 2 of the stop switch can be replaced by a pulse from pole B of the GO2 switch or by a pulse from the GO1 switch to put the printer back into operation.

The clear-operate switch has two poles. When the switch is set to Clear, pole 1 locks the motor flip-flop into "motor off" and locks the printer action FF in set position. This prevents operation of the center drive motor and holds the printer action FF inhibition on the print gate. Pole 2 of the clear-operate switch inhibits the clear gate, locking the print relay amplifier in the off position.

If the clear-operate switch is thrown to Clear at any time other than after the stop switch is operated, the clear switch may cause the printer to drop a character without having printed it. This can occur because the timing relay is energized while the MFF is in "motor off," thus clearing the function table.

For Computer Digit Copy operation, the function switch on the printer dolly is set to Computer Digit Copy, and the printer substitutes typed symbols for the non-printing control functions. The several pulse combinations on the tape that are interpreted as printed symbols in Computer Digit Copy, but not in Normal operation, are shown in the following table of equivalents:

| | |
|---|---|
| Tabulation | becomes *. |
| Carriage return | becomes /. |
| Single shift | becomes —. |
| Shift lock | becomes *z*. |
| Unshift | becomes 8. |
| Ignore | becomes *x*. |
| Breakpoint (when unobserved) | becomes *y*. |

In Computer Digit Copy, for example, the tabulation instruction does not energize the tabulation actuator, but instead prints an asterisk. The context must be considered in order to interpret Computer Digit Copy correctly. No characters are shifted when the function switch is in the Computer Digit Copy position. Thus, some of the upper case punctuation marks appear as numerals in Computer Digit Copy.

All the function switch sections are shown in the Normal position on the block diagram. When the FS is switched to Computer Digit the substitution symbols may be typed by either of two pulse combinations. For instance, a function table output on either the virgule or the CRN line will type a virgule.

The carriage return function is automatic in Computer Digit Copy, and is not controlled by the carriage return instruction from the magnetic tape. The carriage return operation cycle in Computer Digit is initiated whenever the margin switch closes. The margin switch closes as the typewriter carriage approaches the margin stop. When the margin switch closes, it completes a circuit for the energizing current through the margin relay. The margin relay pole MR–2 switches the following PAS pulse to the bounce DF. Pole MR–1 provides that the bounce delay flop signal energizes the carriage return and unshift relay during the set interval. Pole USR–3 energizes the carriage return actuator by way of function switch poles FS–1 and FS–2.

As the typewriter carriage leaves the right hand position, the MRS opens and de-energizes the MR. While the carriage is returning, the carriage return switch changes in position, and charges its capacitor from the voltage supply line. At the end of the carriage return, the CRNS moves back to normal position and delivers a positive pulse to set the bounce DF. This time pole MR–1 is in the de-energized position, so that the pulse sent out by the bounce DF after one hundred milliseconds is routed through poles MR–1, USR–4, a differentiator, an amplifier, stop switch pole 1, and test switch pole 2 to the printer action FF. This pulse replaces the PAS pulse that was used to energize the USR.

The length of each line of type on the Computer Digit Copy is determined solely by the setting of the margin stops on the typewriter, and does not depend at all upon the instructions on the magnetic tape.

For Test operation, the test switch, located on the tape reader, can convert the printer to straight serial operation. With the test switch in the Test position, the printer typing speed is about eight characters a second. In typing characters, the printer sends out an end-of-print pulse as soon as the typewriter actuators are de-energized. With the test switch in the Operate position, the function table is cleared and the next character is set up in the thyratron line while the previous character is being typed. If the printer operation cycle is interrupted by the stop switch or by the absence of a printer action signal, the pulse code for the next character to be typed will be set up in the function table neon lights in the printer dolly cabinet.

In the Test position, pole 1 of the test switch connects the CL delay flop input to the printer action line, rather than to the end-of-print line. This holds up the clearing and reading operation until the type bar is on the way down after having typed the character. If for any reason the PAS pulse should not be generated, the printer will halt with the function table neon lights indicating the pulse combination of the present character. Pole 2 of the test switch effectively removes the printer action flip-flop inhibition from the print gate during Test operation. In Test, the effective print gate inhibitions are from the motor FF during "motor on," and from the 20-millisecond DF during "set." The test switch setting does not affect the ignore operation cycle.

IX. TYPER-PRINTER OPERATION, FIG. 18

The printer dolly may be operated in conjunction with an electrical input system which records and stores coded information in the form of pulses on a magnetized tape so as to make a typewritten copy of the information so recorded and stored. Such an electrical input system will be referred to as a "typer," hereinafter. A suitable typer is disclosed and claimed by Herbert Frazer Welsh, John Presper Eckert, Jr., and Edwin I. Blumenthal in patent application Serial No. 279,712, filed March 31, 1952, entitled Information Translating Apparatus.

The typer, as disclosed in the above identified application, comprises: a keyboard which sends out two signals; a function table to encode one of the keyboard signals to set up a thyratron line and recording heads; a tape stepping unit to step the tape past the recording heads upon receipt of the second keyboard signal and to record the data; a clear circuit actuated by the second keyboard signal to clear the thyratron line after recording is complete; an error circuit to stop the typer, notify the typist that an error has been made and prevent further typing from being effective; and an erase circuit which steps the typer backward and erases incorrect characters from the tape.

When the printer dolly is connected to a typer, circuit connections between these two units are necessary, as shown in the block diagram of Figure 18. The anode of each typer thyratron of the thyratron line is capacity-coupled to the control grid of the corresponding printer thyratron. The motor flip-flop is connected to be set normally by the "set-up" signal from the printer thyratron line cathode transformer through several switches in the typer circuits. During erase or backspace operations by the typer, the motor flip-flop is connected to be set by signals from the typer passing through a printer on-off switch at the typer and the printer function switch. Three of the six poles of the timing relay are located in the typer circuits and are effective to prevent spurious operation by the typer as long as the printer is active. The 20–MS delay flop period is lengthened to thirty milliseconds by shunting the normal timing capacitor with an additional capacitor. The clear delay flop is connected to be set by a typer start switch to clear any thyratrons in the thyratron line which may be fired. The motor flip-flop is similarly set to the "go" position, and the printer action flip-flop is likewise set to the "normal" position by the same typer start switch.

The normal operation of a typer-printer interconnection will now be described in connection with the block diagram as shown in Figure 18. When a typer key is struck, the typer thyratrons are set up, the tape is stepped, the data is recorded and the thyratrons are cleared. When the typer thyratrons are cleared, the printer thyratrons are set up. This sequence insures that the character is recorded on tape correctly before it is printed on paper. The printer thyratrons control the relay function table to select a type bar. A pulse also leaves the printer thyratron line and passes through two relay contacts and a switch in the typer circuits to set the motor flip-flop. When set, MFF energizes the timing relay. The three TR poles in the typer circuits are TR–2, TR–4 and TR–5. TR–2 prevents another keyboard operation from being effective. TR–4 prevents a new combination which may be set up in the loop system, which performs automatic functions, from being effective at this time. TR–5 prevents any spurious pulses from being effective after a spurious pulse detector is released.

MFF also sets the 30–MS delay flop. This delay flop inhibits the print gate for thirty milliseconds to allow time for the relay function table to set up before any attempt is made to print the character. When the 30–MS delay flop recovers, it releases the print gate. This gate applies +E to set the print delay flop. Immediately the print delay flop sets the printer action flip-flop which inhibits the print gate.

The print delay flop energizes the print relay for thirty milliseconds. This relay applies actuating power to the typewriter keys to print the character. When the print relay drops out, it removes actuating power from the typewriter actuator. As the actuator current decays, the actuator coil develops an inductive kick which is the end-of-print pulse. This pulse sets the clear delay flop. The clear delay flop energizes the clear relay for five milliseconds. The clear relay pole clears the printer thyratrons. When the clear DF recovers, it releases the clear relay which then restores MFF and sets DF4 in the typer. When restored, the motor flip-flop inhibits the print gate and releases the timing relay.

When the TR poles return to the de-energized position, they release the printer thyratrons, the ignore flip-flop and the typer circuits in preparation for the next character. At the typer, delay flop 4 inhibits the spurious pulse detector for ten milliseconds and then sends out the probing pulse to examine the interpreting relays for automatic functions.

As the type bar prints a character, it generates the printer action signal. This signal restores the printer action flip-flop to indicate that the character has been printed. The restoration of the printer action flip-flop removes the printer action inhibition from the print gate to ready it for the next character. Since this gate is inhibited by MFF, no further action can take place until the next character is typed.

When the backspace key is struck, it sets MFF via BS–3 in the typer and the function switch FS–12, which is in the Computer Digit position. MFF is not set to "wait" by the printer since the backspace operation does not set up a pulse combination in the thyratrons. The print relay is energized in the same manner as in forward operation and causes the PR pole to close. This, in turn, applies —E to the semicolon actuator via BS–6. Thus, the printer types a semicolon for each backspace operation.

When an erase operation is initiated and the function switch is set on Computer Digit, MFF is set by a reverse signal via DF5 and ERS–6 in the typer. The carriage return relay is energized through the PR pole and ERS–5. However, since erasure is an automatic operation which requires a recycling pulse until a stop signal occurs in the typer, the pulse which has been dead-ended by TR–4 must be generated again. After the carriage has returned, the clear pulse restores MFF to the "go" position which causes timing relay contacts to return to normal. The clear pulse also enters the typer to set DF4. The recovery pulse from DF4 examines for a stop signal in the typer. Until this stop signal is generated, this pulse reinitiates the erasing cycle in the typer and the CRN cycle in the printer. When the stop signal appears, ERS–5 opens, thereby causing the carriage return relay to drop out, and the action is terminated.

When the skip key on the typer is struck, the typer circuits operate normally. The delay flop 5 pulse in the typer sets up a predetermined character in the typer thyratrons. This character code is transferred to the printer thyratrons. Firing the printer thyratrons operates the printer circuits to print this character for every skip cycle. If the skip line is encoded into an ignore, the normal ignore operation is carried out, as described below.

When the ignore key on the typer is struck, the pulse code is set up in the typer and then in the printer thyratrons. The typer steps to record the character, but action is held up by the timing relay. If the function switch in the printer is set to Normal, MFF and the 30–MS delay flop are set. The timing relay is energized. The function table selects the ignore line. When energized, this line alerts the ignore gate. A recovery pulse from the 30–MS delay flop passes the ignore gate to set the ignore delay flop. This delay flop immediately inhibits the print gate for forty milliseconds, before this gate has had time to recover from the inhibition imposed by the 30–MS delay flop. As the ignore delay flop is set, it provides a setting pulse for the clear delay flop which energizes the clear relay for five milliseconds. The clear relay pole provides —E to clear the printer thyratrons. Upon recovery, the clear relay restores MFF and sets DF4 in the typer. MFF inhibits the print gate when set. Thus, the print gate is inhibited for the entire operation, and no printing takes place. Setting MFF also releases the timing relay. TR–1 rapidly brings the ignore delay flop to restorable condition. The recovery pulse from DF4 examines for automatic functions at the typer.

If the printer function switch is in Computer Digit position, the ignore operation is not carried out. Instead, the ignore signal is used to excite the *x* line and the printer prints an *x*.

When the function switch is in the Normal position, operating the carriage return key on the typer energizes the carriage return actuator. This causes the typewriter carriage to return. While so doing the carriage trips the carriage return switch. When the CRNS returns to normal position, it generates the carriage return signal which sets the bounce delay flop. One hundred milliseconds later the delay flop recovers and restores the printer action flip-flop which had previously been set by the print DF. This removes the printer action inhibition from the print gate in preparation for the next character which may have already been initiated at the typer.

When the function switch is in the Computer Digit position, carriage return takes place automatically. As the last character of a line is typed, the carriage trips the margin switch. This action energizes the margin relay. As the type bar falls back, it trips the printer action switch. The printer action signal, thus generated, is routed to the bounce delay flop by MR–2. As the delay flop sets, it sends a pulse through MR–1 to energize the CRN actuator via the unshift relay. As the carriage returns, it releases the carriage return switch and the margin switch. The latter sends out a signal to set the bounce delay flop again, which has recovered from its setting by the printer action signal. One hundred milliseconds later this delay flop restores the printer action flip-flop to terminate the action. The one hundred MS delay insures that the carriage comes to a standstill and is not bouncing when the next character is printed. Thus, the automatic carriage return requires more than two hundred milliseconds. During this time the typist may have typed one more character. The resulting action may have recorded the character on tape and may have energized the printer circuits up to the end of the thirty-millisecond delay. However, the printer action flip-flop inhibition on the print gate will still be effective and thus interrupt the printing sequence. If the typist attempts still another character, the typing rate limiter in the typer, jammed by the timing relay TR–2, will record an error. If a typer automatic function is in progress at the time of the automatic carriage return, TR–5 holds up the operation.

The sprocket channel referred to is disposed intermediate among the parallel channels illustrated in Figure 2. Where a triode is indicated, one section of the dual triode type commercially designated as 6SN7 has generally been found satisfactory. Where a tetrode is indicated, the commercial type 25L6 has been found satisfactory, and where thyratrons are shown, the type 2050 has given satisfactory results. The operating circuit impedances have been chosen, in conjunction with the operating potentials and the characteristics of the aforesaid vacuum tubes, to provide the necessary signal and control potentials. Although vacuum tubes have been referred to in the course of the discussion of the invention, it will be understood that any other device or system having suitable valving or control properties may also be employed such as, without limitation, magnetic amplifiers, transistors and the like.

It should be understood, however, that the invention is represented in the specific function or functions of any individual circuit and in the basic relationships between the different circuits. It may, therefore, be regarded as obvious that any change in the set-up of the apparatus is unessential as long as such change does not affect such functions or basic relationships.

What is claimed is:

1. In apparatus for use with a record bearing medium, sensing apparatus responsive to entries of first and second nature associated with said medium, driving apparatus normally under the influence of said sensing apparatus relatively displacing said sensing device and said medium, apparatus responsive to the absence of entries of said first nature appearing at said sensing apparatus for a predetermined period of time for operating said driving apparatus independently of said sensing apparatus for a first period of time, and apparatus responsive to the presence of entries of said second nature appearing at said sensing apparatus for operating said driving apparatus independently of said sensing apparatus for a second period of time.

2. In apparatus for use with a record bearing medium and responsive to group entries on said medium, apparatus for transferring the intelligence represented by said group entries to another medium, said group entries being normally characterized by an odd number of component parts, and apparatus responsive to the presence of any even number of component parts in a group entry for disabling the transfer process.

3. In apparatus for use with a record bearing medium bearing intelligence in the form of group entries disposed in side by side relationship, wherein at least three components comprise a group, sensing apparatus operatively associated with said medium and responsive to entries thereon, display apparatus connected with said sensing apparatus controlled by a predetermined number of the components comprising a group entry, and apparatus controlled by an intermediate one of said side by side entries for modifying the operation of said display apparatus.

4. In apparatus responsive to intermingled data corresponding to character and numerical representation, and to control functions regulating the distribution of characters and numerals; display apparatus responsive to said character and numerical data; display distributing apparatus responsive to said control function data; and apparatus disabling the response of said display distributing apparatus to said control function data and rendering said display apparatus responsive thereto.

5. In apparatus for displaying information in a controlled arrangement, display apparatus controlled from a source of display information, first margin controlling apparatus responsive to a source of display distribution regulating information, second margin controlling apparatus responsive to displacement of displayed information, and apparatus disabling the display process when the requirements of said second margin controlling apparatus interfere with the requirements of said first margin controlling apparatus, said disability being maintained until the interference of said second margin controlling apparatus is removed.

6. In combination, apparatus for sequentially accepting and displaying data, manually operable control apparatus causing said accepting and displaying apparatus to accept a single entry and stop thereafter, and a second manually operable control apparatus causing the display of said data entry by said accepting and displaying apparatus to initiate thereby the acceptance and display of the next succeeding data entry.

7. In translating apparatus, a magnetic tape carrying information in the form of magnetized spots, a tape translating apparatus, information sensing apparatus including a magnetic reading head adapted for association with said tape, display apparatus controlled by said sensing apparatus, control apparatus governing the operativeness and inoperativeness of said tape translating apparatus, and apparatus inhibiting operation of said sensing apparatus when said tape translating apparatus is inoperative.

8. In translating apparatus, a magnetic tape carrying information in the form of magnetized spots, a tape translating apparatus, a magnetic reading head adapted for association with said tape, display apparatus controlled by information appearing at said reading head, control apparatus governing the operativeness and inoperativeness of said tape translating apparatus, and apparatus rendering said display apparatus insensitive to information appearing at said reading head when said tape translating apparatus is inoperative.

9. In apparatus for use with a magnetic record carrier, a sensing device associated with said record carrier, a storage register connected with said sensing device, apparatus performing a display operation in response to the contents of said storage register, apparatus governed by the performance of said display operation for clearing said storage register before the completion of said display operation, and apparatus initiating the presentation of new information on said record carrier to said sensing device before the completion of said display operation.

10. In combination, a data entry device, a data recording device adapted to cooperate with a record receiving medium, apparatus normally causing said record receiving medium to present record receiving areas to said data recording device in predetermined sequence, a printing device controlled by data delivered to said recording device, apparatus for varying the sense of presentation of record receiving areas to said data recording device, and apparatus causing said printing device to print a predetermined character when said sense of presentation is varied.

11. In combination, a data entry device, a data recording device adapted to cooperate with a record receiving medium, apparatus normally causing said record receiving medium to incrementally present record receiving areas to said data recording device in predetermined sequence, a printing device controlled by data delivered to said recording device, apparatus for reversing the sense of presentation of said record receiving areas to said data recording device for a plurality of incremental displacements, and apparatus changing the distribution of printed copy display produced by said printing device during said reverse presentation.

12. In a character forming system, a device for sequentially forming characters, first apparatus placing said device in a first character forming state, a first means responsive to the placing of said device in said first state to generate a first signal, a second means responsive to said first signal to form a character in said first state, and second apparatus responsive to the forming of a character placing said device in a second character forming state, said second apparatus including a third means responsive to the formation of a character in said first state to generate a second signal, and a fourth means responsive to said second signal for placing said device in said second state.

13. In a character forming system, apparatus for sequentially forming characters, a carriage traverse mechanism supporting and transporting a character receiving medium, a shift mechanism varying the nature of characters impressed on said medium, a delay element having an output controlling the formation of said characters, a shift controlled signal source connected with an input to said delay element, and a carriage traverse controlled signal source connected with an input of said delay element.

14. In a signal translating system, means for sensing signal entries recorded on a record bearing medium, means for storing sensed signal entries, means for creating relative motion between a record bearing medium and said sensing means, means responsive to the storing of sensed signal entries in said storing means for disabling said motion creating means, means for clearing said storing means, and means responsive to the clearing of said storing means for terminating the disability of said motion creating means.

15. In a signal translating system, means for sensing signal entries recorded on a record bearing medium, means for creating relative motion between a record bearing medium and said sensing means, means for storing sensed signal entries, means responsive to the storing of sensed signal entries in said storing means for disabling said motion creating means, first apparatus for performing a first function in response to the storing of sensed signal entries of a first predetermined character in said storing means, first mechanism responsive to the performance of said first function for clearing said storing means at the end of a first predetermined time period after the storing of sensed signal entries of said first predetermined character, second apparatus for performing a second function in response to the storing of sensed signal entries of a second predetermined character, second mechanism responsive to the performance of said second function for clearing said storing means at the end of a second predetermined time period after the storing of sensed signal entries of said second predetermined character, and means responsive to the clearing of said storing means for terminating the disability of said motion creating means.

16. In combination, a data entry device, a data printing device operated from said data entry device, a data recording device adapted to record on a magnetic medium and operaitve from said data entry device, means for creating relative motion between said magnetic medium and said data recording device, a timing relay having electrical contacts, means responsive to the turning off of said motion creating means for operating said relay to close said electrical contacts for a predetermined period of time, and means responsive to the closing of said electrical contacts for disabling said data entry device when an attempt is made to insert a data entry before said electrical contacts are opened.

17. In combination, electrically operable means for preparing a printed record including a plurality of printing elements and individual means for operating each of said printing elements, a record bearing medium having information signals recorded thereon, means for sensing said information signals, said sensing means comprising head means for detecting information signals as they move by said head means and drive means for producing relative motion between said head means and said medium, said head means generating electrical signals corresponding to detected information signals, electrical storage means for receiving electrical signals from said head means and for storing said electrical signals so received, means responsive to the transfer of electrical signals from said head means to said storage means for de-energizing said drive means and thus halting the relative motion between said medium and said head means, means responsive to electrical signals stored in said storage means for energizing individual operating means corresponding to the information from which said electrical signals were generated, said energized individual operating means causing appropriate printing elements to print, pulse generating means responsive to the energization of each of said operating means for generating a print pulse, first means responsive to said print pulse for clearing the storage means of electrical signals stored therein, and second means responsive to said print pulse for re-energizing said drive means to re-establish said relative motion.

18. In combination, electrically operable means for preparing printed records in a first code system in accordance with information recorded in a second code system and including a plurality of printing elements, a plurality of printing control elements, and individual operating means for each of said printing and printing control elements; a record bearing medium having information and control signals recorded thereon in a second code system; means for sensing signals recorded on said medium comprising head means for detecting signals recorded on said medium as the signals move by said head means and drive means for creating relative motion between said medium and said head means; said head means generating electrical signals in response to detected signals; said electrical signals bearing a predetermined relationship to detected signals in said second code system; electrical storage means for receiving electrical signals from said head means and for storing electrical signals so received; means responsive to the transfer of electrical signals from said head means to said storage means for de-energizing said drive means and thus terminating said relative motion; means responsive to signals stored in said storage means for selecting and energizing particular individual operating means in accordance with the second code system signals detected by said head means; said individual operating means causing the performance of the intended control or imprinting operation; pulse generating means responsive to the energization of said individual operating means to generate print pulses; first means responsive to a print pulse for clearing the storage means of electrical signals stored therein; and second means responsive to a print pulse for re-energizing said drive means to re-establish the relative motion between said medium and said head means.

19. Apparatus for translating alphabetical, numerical and symbolical information recorded in a first code system into corresponding information recorded in a second code system comprising means for sensing information recorded in a first code system; drive means for creating relative motion between a record medium bearing information in said first code system and said sensing means; said sensing means generating electrical signals representative of information sensed by said sensing means; storage means for receiving and storing electrical signals generated by said sensing means; means responsive to the transfer of electrical signals from said sensing means to said storage means for de-energizing said drive means to terminate said relative motion; means for recording alphabetical, numerical and symbolical information in a second code system including individual recording elements for each character of said second code system, recording control elements and operators individual to each of said elements; means responsive to electrical signals stored in said storage means for selecting and energizing said individual operators in accordance with the information represented by said electrical signals; the energization of individual operators causing the performance of the appropriate control or recording operations; pulse generating means responsive to the energization of individual operators to generate print pulses; first means responsive to a print pulse to clear the storage means of electrical signals stored therein; and second means responsive to said print pulse for re-energizing said drive means.

20. Apparatus for automatically translating alphabetical, numerical and symbolical information recorded in a first code system into corresponding information recorded in a second code system comprising means for sensing information recorded in a first code system; said sensing means comprising head means for detecting first code system characters and drive means for creating relative motion between said head means and the information detected thereby; said head means converting detected characters into electrical signals representative of the same information; storage means connected to said head means for storing electrical signals transferred thereto from said head means; means responsive to the transfer of electrical signals to said storage means for de-energizing said drive means; recording means comprising recording elements for each character of said second code system, recording control elements for controlling variations in the operation of the recording means, and individual operators for each of said elements; means connected to said storage means and responsive to electrical signals stored therein for actuating individual operators which correspond to the information represented by the electrical signals; the actuation of the individual operators causing the performance of the appropriate recording and control operation; first pulse generator means responsive to the energization of said individual operators for generating first print pulses; clearing means responsive to a print pulse for clearing said storage means of signals stored therein; and energizing means responsive to a print pulse for re-energizing said drive means.

21. The translating apparatus defined in claim 20 further including means responsive to a lack of recorded signals of a first nature being sensed by said head means during a predetermined interval of time for maintaining energization of said drive means for a first predetermined period of time irrespective of the sensing of signals during said first period, and means responsive to the sensing of signals of a second nature for maintaining energization of said drive means for a second period of time irrespective of the sensing of signals by said head means during said second period of time.

22. The translating apparatus defined in claim 20 further including a first timing means for generating a first output signal at the end of a first time period, said first timing means being responsive to each clearing of said storage means for reinitiating said first time period, second timing means for generating a second output signal for the duration of a second time period, said second timing means being responsive to said first output signal to initiate said second time period, and disabling means responsive to said second output signal for its duration for preventing the transfer of electrical signals from said head means to said storage means.

23. The translating apparatus defined in claim 22 further including a third timing means responsive to the sensing of a preselected recorded signal to produce a third output signal for the duration of a third time period, said disabling means being responsive to said third output signal for its duration for preventing the transfer of electrical signals from said head means to said storage means.

24. The translating apparatus defined in claim 20 wherein said recording means normally records in a first character forming state, said recording control elements including shift means for placing said recording means in a second character forming state, said shift means operating in response to the storage of predetermined electrical signals in said storage means, second pulse generating means responsive to the operation of said shift means for generating a second print pulse, means for applying said second print pulse to said clearing and energizing means to clear said storage means and to re-energize said drive means, and means responsive to the recording of a subsequently sensed character in said first code system to disable said shift means to place said recording means in said first character forming state.

25. The translating apparatus defined in claim 20 wherein said recording control elements include means responsive to the storing of preselected electrical signals in said storage means for generating a third print pulse without the recording of a character, and means for applying said third print pulse to said clearing and energizing means for clearing said storage means and re-energizing said drive means.

References Cited in the file of this patent

UNITED STATES PATENTS

| | | |
|---|---|---|
| 1,163,564 | Schneeloch | Dec. 7, 1915 |
| 1,606,126 | Houston | Nov. 9, 1926 |
| 2,199,541 | Harrison et al. | May 7, 1940 |
| 2,240,562 | Lake et al. | May 6, 1941 |
| 2,283,538 | Clark | May 19, 1942 |
| 2,375,271 | Ayres | May 8, 1945 |
| 2,377,801 | Mills et al. | June 5, 1945 |
| 2,378,371 | Tholstrup | June 12, 1945 |
| 2,448,842 | Tholstrup | Sept. 7, 1948 |
| 2,484,649 | Root | Oct. 11, 1949 |
| 2,540,030 | Hamilton et al. | Jan. 30, 1951 |
| 2,543,935 | Rabenda et al. | Mar. 6, 1951 |

UNITED STATES PATENT OFFICE

CERTIFICATE OF CORRECTION

Patent No. 2,860,756 November 18, 1958

Louis D. Wilson et al.

It is hereby certified that error appears in the printed specification of the above numbered patent requiring correction and that the said Letters Patent should read as corrected below.

Column 4, line 55, for "FC-function switch" read -- FS-function switch --; column 15, line 43, for "diflerence" read -- difference --; column 21, line 34, for "fom" read -- from --.

Signed and sealed this 5th day of May 1959.

(SEAL)
Attest:

KARL H. AXLINE

Attesting Officer

ROBERT C. WATSON
Commissioner of Patents